US008964087B2

(12) United States Patent
Kurahashi et al.

(10) Patent No.: US 8,964,087 B2
(45) Date of Patent: Feb. 24, 2015

(54) IMAGING DEVICE, METHOD FOR CONTROLLING IMAGING DEVICE, AND STORAGE MEDIUM STORING A CONTROL PROGRAM

(71) Applicant: FUJIFILM Corporation, Tokyo (JP)

(72) Inventors: Hidekazu Kurahashi, Saitama (JP); Kenkichi Hayashi, Saitama (JP); Seiji Tanaka, Saitama (JP); Tomoyuki Kawai, Saitama (JP); Noriko Kawamura, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/315,456

(22) Filed: Jun. 26, 2014

(65) Prior Publication Data
US 2014/0327797 A1    Nov. 6, 2014

Related U.S. Application Data

(63) Continuation of application No. PCT/JP2012/083973, filed on Dec. 27, 2012.

(30) Foreign Application Priority Data

Dec. 27, 2011    (JP) .................................. 2011-286688

(51) Int. Cl.
*H04N 5/335*    (2011.01)
*H04N 9/077*    (2006.01)
(Continued)

(52) U.S. Cl.
CPC ............... *H04N 9/077* (2013.01); *H04N 9/045* (2013.01);
(Continued)

(58) Field of Classification Search
CPC ... H04N 9/045; H04N 5/347; H04N 5/37457; H04N 1/195; H04N 3/1562; H01L 27/14621; H01L 27/14603; H01L 27/14609; H01L 27/14643; H01L 27/14645; H01L 27/14689; A22C 9/008
USPC .............. 348/221.1, 234, 266, 268, 272, 294, 348/297, 300, 301, 302, 308
See application file for complete search history.

(56) References Cited

U.S. PATENT DOCUMENTS

| 6,995,796 | B2 | 2/2006 | Taubman |
| 2002/0149686 | A1 | 10/2002 | Taubman |

(Continued)

FOREIGN PATENT DOCUMENTS

| JP | 8-23542 A | 1/1996 |
| JP | 8-23543 A | 1/1996 |

(Continued)

OTHER PUBLICATIONS

International Search Report, mailed Apr. 2, 2013, issued in PCT/JP2012/083973.

(Continued)

*Primary Examiner* — Twyler Haskins
*Assistant Examiner* — Padma Haliyur
(74) *Attorney, Agent, or Firm* — Birch, Stewart, Kolasch & Birch, LLP

(57) ABSTRACT

A large difference in exposure timing is prevented from arising in cases in which plural pixels have a common amplifier, even when image data is read by thinning
An imaging apparatus (10) includes: an image pickup device (14) including plural photoelectric conversion elements arrayed in first and second directions; an amplification means that treats (K×L) pixels as respective common pixels and amplifies an image capture signal for each of the common pixels; a color filter that is provided with a repeatedly disposed basic array pattern or first and second filters placed in a predetermined pattern of (N×M) pixels; and an image processing section (20) and a drive section (22) that perform charge sweeping by applying sequential shutter pulses to the image pickup device (14) in turn to each pixel, or to each scan line, or to each of plural pixels on a scan line, that read pixel signals of the plural pixels at a set cycle, that, from the read pixel signals, generate line image data of pixels that are arrayed running along the second direction at a cycle of from K pixels to N pixels in the first direction, and that generate image data based on the line image data.

11 Claims, 29 Drawing Sheets

(51) Int. Cl.
  *H04N 9/04* (2006.01)
  *H04N 9/083* (2006.01)
  *H04N 3/14* (2006.01)
  *H04N 9/64* (2006.01)

(52) U.S. Cl.
  CPC ............ *H04N 9/083* (2013.01); *H04N 3/1512* (2013.01); *H04N 9/648* (2013.01); *H04N 2209/045* (2013.01)
  USPC ........... 348/308; 348/302; 348/301; 348/300; 348/296; 348/297

(56) References Cited

U.S. PATENT DOCUMENTS

| | | |
|---|---|---|
| 2004/0109068 A1 | 6/2004 | Mitsunaga et al. |
| 2004/0169747 A1 | 9/2004 | Ono et al. |
| 2006/0203113 A1 | 9/2006 | Wada et al. |
| 2006/0222269 A1 | 10/2006 | Ohno |
| 2007/0153104 A1 | 7/2007 | Ellis-Monaghan et al. |
| 2008/0151083 A1 | 6/2008 | Hains et al. |
| 2010/0085452 A1* | 4/2010 | Hirakawa et al. ............ 348/273 |
| 2010/0321616 A1 | 12/2010 | Ha et al. |
| 2011/0009041 A1 | 1/2011 | Spisich et al. |
| 2011/0069189 A1 | 3/2011 | Venkataraman et al. |
| 2011/0080493 A1 | 4/2011 | Kono et al. |
| 2011/0134291 A1* | 6/2011 | Rueckert et al. ............ 348/280 |
| 2012/0025060 A1 | 2/2012 | Iwata |

FOREIGN PATENT DOCUMENTS

| | | |
|---|---|---|
| JP | 11-285012 A | 10/1999 |
| JP | 2000-308080 A | 11/2000 |
| JP | 2002-135793 A | 5/2002 |
| JP | 2004-221839 A | 8/2004 |
| JP | 2004-266369 A | 9/2004 |
| JP | 2005-136766 A | 5/2005 |
| JP | 2007-184904 A | 7/2007 |
| JP | 3960965 B2 | 8/2007 |
| JP | 2007-306490 A | 11/2007 |
| JP | 2008-0236620 A | 6/2008 |
| JP | 2010-512048 A | 4/2010 |
| JP | 2010-153511 A | 7/2010 |
| JP | 2011-4318 A | 1/2011 |
| JP | 2011-29379 A | 2/2011 |
| JP | 2011-82768 A | 4/2011 |
| JP | 2011-523538 A | 8/2011 |
| WO | WO 02/056604 A1 | 7/2002 |
| WO | WO 2008/066698 A2 | 6/2008 |
| WO | WO 2009/151903 A2 | 12/2009 |

OTHER PUBLICATIONS

Office Action, dated May 23, 2013, issued in Chinese Patent Application No. 201180022503.3.

Written Opinion of the International Searching Authority, mailed Apr. 2, 2013, issued in PCT/JP2012/083973.

Written Opinion of the International Searching Authority, mailed Jan. 15, 2013, issued in PCT/JP2012/080899.

Written Opinion of the International Searching Authority, mailed Jan. 15, 2013, issued in PCT/JP2012/081644

Written Opinion of the International Searching Authority, mailed Jan. 22, 2013, issued in PCT/JP2012/080898.

Written Opinion of the International Searching Authority, mailed Jan. 29, 2013, issued in PCT/JP2012/083583.

* cited by examiner

FIG.3

|   |   |   |   |   |   |
|---|---|---|---|---|---|
| G | B | G | G | R | G |
| R | G | R | B | G | B |
| G | B | G | G | R | G |
| G | R | G | G | B | G |
| B | G | B | R | G | R |
| G | R | G | G | B | G |

A ARRAY    B ARRAY

FIG.4

| | A ARRAY | | | B ARRAY | | | | |
|---|---|---|---|---|---|---|---|---|
| G | B | G | G | R | G | G | B | G |
| R | G | R | B | G | B | R | G | R |
| G | B | G | G | R | G | G | B | G |
| G | R | G | G | B | G | G | R | G |
| B | G | B | R | G | R | B | G | B |
| G | R | G | G | B | G | G | R | G |
| G | B | G | G | R | G | G | B | G |
| R | G | R | B | G | B | R | G | R |
| G | B | G | G | R | G | G | B | G |

FIG.9

COLUMN

|   | 1 | 2 | 3 | 4 | 5 | 6 |
|---|---|---|---|---|---|---|
| 1 | 1 | 2 | 3 | 1 | 2 | 3 |
| 2 | 4 | 5 | 6 | 4 | 5 | 6 |
| 3 | 7 | 8 | 9 | 7 | 8 | 9 |
| 4 | 1 | 2 | 3 | 1 | 2 | 3 |
| 5 | 4 | 5 | 6 | 4 | 5 | 6 |
| 6 | 7 | 8 | 9 | 7 | 8 | 9 |

ROW

FIG.11

| 1 | 3 | 2 | 1 | 3 | 2 |
|---|---|---|---|---|---|
| 7 | 9 | 8 | 7 | 9 | 8 |
| 4 | 6 | 5 | 4 | 6 | 5 |

FIG.13

COLUMN

AFTER 1/2 THINNING

FIG.25

| | | | | | | | | | |
|---|---|---|---|---|---|---|---|---|---|
| G | G | G | R | B | G | G | G | R | B |
| B | G | R | G | G | B | G | R | G | G |
| R | B | G | R | B | R | B | G | R | B |
| G | G | B | G | R | G | G | B | G | R |
| B | R | G | G | G | B | R | G | G | G |
| G | G | G | R | B | G | G | G | R | B |
| B | G | R | G | G | B | G | R | G | G |
| R | B | G | R | B | R | B | G | R | B |
| G | G | B | G | R | G | G | B | G | R |
| B | R | G | G | G | B | R | G | G | G |

P (upper-left 5×5 block)

| R | B | G | R | B | R | E | B | R | B | G | R | B | R | E | B |
|---|---|---|---|---|---|---|---|---|---|---|---|---|---|---|---|
| G | G | G | B | E | G | G | R | G | G | G | B | E | G | G | R |
| B | G | G | G | R | G | G | E | B | G | G | G | R | G | G | E |
| R | G | B | R | B | E | R | B | R | G | B | R | B | E | R | B |
| B | R | E | B | R | B | G | R | B | R | E | B | R | B | G | R |
| E | G | G | R | G | G | G | B | E | G | G | R | G | G | G | B |
| R | G | G | E | B | G | G | G | R | G | G | E | B | G | G | G |
| B | E | R | B | R | G | B | R | B | E | R | B | R | G | B | R |
| R | B | G | R | B | R | E | B | R | B | G | R | B | R | E | B |
| G | G | G | B | E | G | G | R | G | G | G | B | E | G | G | R |
| B | G | G | G | R | G | G | E | B | G | G | G | R | G | G | E |
| R | G | B | R | B | E | R | B | R | G | B | R | B | E | R | B |
| B | R | E | B | R | B | G | R | B | R | E | B | R | B | G | R |
| E | G | G | R | G | G | G | B | E | G | G | R | G | G | G | B |
| R | G | G | E | B | G | G | G | R | G | G | E | B | G | G | G |
| B | E | R | B | R | G | B | R | B | E | R | B | R | G | B | R |

P (upper-left 8×8 block)

IMAGING DEVICE, METHOD FOR CONTROLLING IMAGING DEVICE, AND STORAGE MEDIUM STORING A CONTROL PROGRAM

CROSS-REFERENCE TO RELATED APPLICATIONS

This application is a continuation application of International Application No. PCT/JP2012/083973, filed Dec. 27, 2012, the disclosure of which is incorporated herein by reference in its entirety. Further, this application claims priority from Japanese Patent Application No. 2011-286688, filed Dec. 27, 2011.

BACKGROUND

1. Technical Field

The present invention relates to an imaging apparatus, and a control method and a control program for an imaging apparatus, and in particular to an imaging apparatus equipped with a color image pickup device, and a control method and control program for an imaging apparatus of the same.

2. Related Art

A primary color Bayer array (see, for example, Patent Documents 1 to 3), this being a color array widely employed in color image pickup devices, has red (R) and blue (B) placed in sequential lines of a chessboard pattern of green (G) pixels, green being the color to which the human eye is most sensitive and that contributes most to obtaining a brightness signal.

Patent Document 1: Japanese Patent Application Laid-Open (JP-A) No. 2002-135793
Patent Document 2: Japanese Patent No. 3960965
Patent Document 3: JP-A No. 2004-266369

Technical Problem

A CCD (Charge Coupled Device) or a CMOS (Complementary Metal Oxide Semiconductor), for example, can be employed as a color image pickup device. In an image sensor of a MOS type image sensor such as the CMOS, a switch is provided to each photodiode, and, in cases in which charges are swept using a so-called "rolling shutter method", such as in video image capture, a shutter pulse is applied sequentially to each of every scan line, every plural pixels on each scan line, every single pixel, thereby performing sweeping of the charges accumulated in the photodiodes.

Specifically, reset is not performed all at once for all the pixels within a single screen, and reset, exposure start, and image capture signal reading is executed sequentially for each of every scan line, for every plural pixels on a scan line, or every single pixel on a scan line. In such cases of a rolling shutter method, reset, exposure, and reading are, for example, repeated for every scan line.

In a MOS image sensor, in order to achieve a higher degree of device miniaturization, sometimes plural pixels have a common single amplifier. In such cases, only one pixel can be read from within the common pixel. Thus, in cases in which thinned reading is performed for image data in the vertical direction, if an attempt is made to read plural line image data in the vertical direction from within each common pixel, only after completing reset, exposure and reading of pixels on a first reading line within the common pixel, can reset, exposure and reading be performed for the pixels on the next reading line within the common pixel, resulting in a large difference in exposure timing arising, with this sometimes having a negative impact on the image quality, such as in the occurrence of false color in the image.

Conventionally, there are, for example, normally 2×2 pixels with a common single amplifier, and in the case of a conventional Bayer array, the basic array pattern, this being the smallest repeat unit of the color filter array, is 2×2 pixels, and therefore the size of the amplifier common pixel and the size of the basic array pattern pixel match each other. In a Bayer array, in order to obtain pixel signals for R, G, B, the minimum cycle for thinned reading in order to read lines configured from G pixels and R pixels, alternating with lines configured from G pixels and B pixels, is a vertical direction ⅓ thinning in which one line's worth of image data is read from every three lines. In such cases, plural line images are not read from within each common pixel, and the issues such as those described above do not arise.

Note that, even suppose one line's worth of image data is read from every two lines (vertical direction ½ thinning), plural line images within each common pixel are not read, and issues such as those described above do not arise.

However, in cases in which the basic array pattern is 3×3 or larger, it is normally preferable to match the size that is common for amplifiers etc. to the size of the basic array pattern for the following reason.

Due to sensitivity variations caused for example by differences in underlying layout according to the relative position of pixels based around a common amplifier, differences arise in signal amounts even between pixels within the same region that are the same color as each other. Therefore, in order to correct for both signal amount variation originating from a structure in which plural pixels have common circuit elements, such as an amplifier, and signal amount variation such that due to color mixing originating from the color array of the filter color on the image pickup device, a conceivable option is to pre-store the number (NK×ML) of correction coefficients, this corresponding to the lowest common multiple between the repetition cycle (N×M) of the basic array pattern and the repetition cycle (K×L) of the common amplifier structure, and then to select an appropriate correction coefficient for each pixel from these correction coefficients, and multiply the signal amount of each pixel by the selected correction coefficient. However, although four individual pixel correction coefficients suffice in cases in which the color filter has a Bayer array of 2×2 and the amplifier sharing structure is also a four pixel square array of 2×2, in cases in which, for example, the color filter array has an array of 3×3 with an array of 6×6, the number (NK×ML) of the correction coefficients becomes extremely large, increasing the correction processing time and the circuit scale. It is thereby preferable that the size of the common structure of the amplifier and the size of the basic array pattern match in order to lower the number of the correction coefficients.

However, in cases in which the basic array pattern is 3×3 or more, the color filter array is different from the Bayer array, thus it is sometimes possible to acquire pixel signals for R, G, and B even when reading the line image data using ½ thinning in the vertical direction. As a result, in a hitherto normally preferred image pickup device, in which the size of the common structure of the amplifier and the size of the basic array pattern match as described above, in cases in which the line image data is read by vertical direction ½ thinning in order to obtain the desired resolution, this results in plural line image data being read from within each common pixel, with the above issue arising of a large difference in exposure timing occurring.

SUMMARY

The present invention addresses the above issue, and an object thereof is to provide an imaging apparatus, and a control method and a control program for an imaging apparatus, that are capable of preventing a large difference from arising in exposure timing in cases in which plural pixels have a common amplifier, even when image data is read by thinning.

In order to address the above issue, an imaging apparatus of the present invention includes: an image pickup device including plural photoelectric conversion elements arrayed in a predetermined first direction and a second direction intersecting with the first direction; an amplification section that treats as respective common pixels (K×L) pixels in the first direction and the second direction (wherein K, L are integers of 2 or more), and amplifies an image capture signal for each of the common pixels; a color filter that is provided above plural pixels configured by the plural photoelectric conversion elements, the color filter having a repeatedly disposed basic array pattern that includes a first filter corresponding to a first color that contributes most to obtaining a brightness signal, and second filters respectively corresponding to 2 or more second colors other than the first color, placed in a predetermined pattern of (N×M) pixels in the first direction and the second direction (wherein N>K and M>L); a line image data generation section that performs charge sweeping by applying sequential shutter pulses to the image pickup device in turn to each pixel, or to each scan line running along the second direction, or to each plural pixels on a scan line running along the second direction, and reading pixel signals of the plural pixels at a set cycle from the image pickup device, and, from the read pixel signals, generating line image data of pixels, from out of the plural pixels, that are arrayed running along the second direction at a cycle of from K pixels to N pixels in the first direction; and an image data generating section that generates image data based on the line image data.

According to the invention, the image pickup device is equipped with the amplification section that treats the (K×L) pixels in the first direction and the second direction as the respective common pixels, and that amplifies the image capture signal for each of the common pixels, and with the color filter that is provided with the repeatedly disposed basic array pattern in which the first color and the second colors are placed in the predetermined pattern of (N×M) pixels in the first direction and the second direction. Charge sweeping is performed by applying sequential shutter pulses to the image pickup device in turn to each pixel, or to each scan line running along the second direction, or to each plural pixels on a scan line running along the second direction, and reading pixel signals of the plural pixels at a set cycle from the image pickup device, and the line image data running along the second direction is read from the image pickup device at a cycle of from K pixels to N pixels in the first direction. Thus since line image data is not read from plural lines in the first direction within each of the common pixels, this thereby enables large differences in exposure timing to be prevented from occurring, even when line image data is read by thinning in the first direction.

Note that the line image data generation section may generate pixel data of pixels that are arrayed at a cycle of from L pixels to M pixels in the second direction.

According to the invention, not only in the first direction, but line image data is also not generated for plural lines running along the first direction within each of the common pixels in the second direction, this thereby enabling large differences in exposure timing to be prevented from occurring, even when line image data is generated by thinning in the second direction.

Moreover, as the set cycle for reading pixel signals of the plural pixels from the image pickup device, the line image data generation section may generate line image data by reading the pixel signals of pixels, from out of the plural pixels, that are arrayed running along the second direction at a cycle of from K pixels to N pixels in the first direction.

Moreover, as the set cycle for reading pixel signals of the plural pixels from the image pickup device, the line image data generation section may generate line image data by reading the pixel signals of pixels, from out of the plural pixels, that are arrayed at a cycle of from L pixels to M pixels in the second direction.

Moreover, one or more of the first filter may be placed in each line in the color filter in the first direction, the second direction, and third directions that intersect with the first direction and the second direction; and the second filters that respectively correspond to each color of the second colors may be placed such that there is 1 or more of each in each line in the basic array pattern in the first direction and the second direction.

According to the invention, the first filter that corresponds to the first color contributing the most to obtaining a brightness signal is placed in the color filter in each of the lines in the first direction to the third directions, thereby enabling the reproduction precision of synchronization processing to be raised in high frequency regions. Moreover, the second filters corresponding to 2 or more second colors other than the first color are placed such that there is 1 or more of each in each line in the basic array pattern in the first direction and the second direction, enabling generation of color moiré (false color) to be reduced, and a high resolution to be obtained.

Configuration may be made such that the color filter includes a square array corresponding to 2×2 pixels configured from the first filter.

According to the invention, which direction, out of each of the four directions, is the brightness correlation direction can be determined by determination of the minimum pixel separation based on difference values of pixel values between each of the pixels of the 4 pixels of the square array corresponding to the 2×2 pixels.

Configuration may be made such that the first color is green (G), and the second colors are red (R) and blue (B).

Configuration may be made such that: the color filter includes an R filter, a G filter, and a B filter corresponding to colors red (R), green (G) and blue (B); and the color filter is configured by a first array and a second array alternately arrayed in the first direction and the second direction, wherein the first array corresponds to 3×3 pixels with the G filter placed at the center and the 4 corners, the B filter placed at the top and bottom of the central G filter, and the R filter placed at the left and right of the central G filter, and the second array corresponds to 3×3 pixels with the G filter placed at the center and the 4 corners, the R filter placed at the top and bottom of the central G filter, and the B filter placed at the left and right of the central G filter.

According to the invention, if 5×5 pixels (a local region of a mosaic image) are extracted centered on the first array or the second array, 2×2 pixels of G pixels are present at the 4 corners of the 5×5 pixels. The pixel values of these 2×2 pixels of G pixels can be employed to determine the correlation direction out of 4 directions.

Moreover, configuration may be made such that: the color filter includes an R filter, a G filter, and a B filter corresponding to colors red (R), green (G) and blue (B); and the color filter is configured by a first array and a second array alternately arrayed in the first direction and the second direction, wherein the first array corresponds to 3×3 pixels with the R filter placed at the center, the B filter placed at the 4 corners, and the G filter placed at the top, bottom, left and right of the central R filter, and the second array corresponds to 3×3 pixels with the B filter placed at the center, the R filter placed at the 4 corners, and the G filter placed at the top, bottom, left and right of the central B filter.

According to the invention, if 5×5 pixels (a local region of a mosaic image) are extracted centered on the first array or the second array, there is a G pixel present in adjacent contact in the horizontal direction and the vertical direction with the central pixel (the R pixel or the B pixel) of the 5×5 pixels. The pixel values of these G pixels (a total of 8 pixels) can be employed to determine the correlation direction out of 4 directions.

A control method for an imaging apparatus of the present invention is a control method for an imaging apparatus including an image pickup device including plural photoelectric conversion elements arrayed in a predetermined first direction and a second direction intersecting with the first direction, an amplification section that treats as respective common pixels (K×L) pixels in the first direction and the second direction (wherein K, L are integers of 2 or more), and amplifies an image capture signal for each of the common pixels, and a color filter that is provided above plural pixels configured by the plural photoelectric conversion elements, the color filter having a repeatedly disposed basic array pattern that includes a first filter corresponding to a first color that contributes most to obtaining a brightness signal, and second filters respectively corresponding to 2 or more second colors other than the first color, placed in a predetermined pattern of (N×M) pixels in the first direction and the second direction (wherein N>K and M>L). The control method includes: performing charge sweeping by applying sequential shutter pulses to the image pickup device in turn to each pixel, or to each scan line running along the second direction, or to each of groups of plural pixels on a scan line running along the second direction, and reading from the image pickup device pixel signals of the plural pixels at a set cycle; generating, from the read pixel signals, line image data of pixels, from out of the plural pixels, that are arrayed running along the second direction at a cycle of from K pixels to N pixels in the first direction; and generating image data based on the line image data.

A control program of the present invention is a control program that causes processing to be executed in a computer that controls an imaging apparatus equipped with an image pickup device including plural photoelectric conversion elements arrayed in a predetermined first direction and a second direction intersecting with the first direction, an amplification section that treats as respective common pixels (K×L) pixels in the first direction and the second direction (wherein K, L are integers of 2 or more), and amplifies an image capture signal for each of the common pixels, and a color filter that is provided above plural pixels configured by the plural photoelectric conversion elements, the color filter having a repeatedly disposed basic array pattern that includes a first filter corresponding to a first color that contributes most to obtaining a brightness signal, and second filters respectively corresponding to 2 or more second colors other than the first color, placed in a predetermined pattern of (N×M) pixels in the first direction and the second direction (wherein N>K and M>L). The processing includes: a reading step of performing charge sweeping by applying sequential shutter pulses to the image pickup device in turn to each pixel, or to each scan line running along the second direction, or to each of groups of plural pixels on a scan line running along the second direction, and reading from the image pickup device pixel signals of the plural pixels at a set cycle; a step of generating, from the read pixel signals, line image data of pixels, from out of the plural pixels, that are arrayed running along the second direction at a cycle of from K pixels to N pixels in the first direction; and a step of generating image data based on the line image data.

Advantageous Effects of Invention

According to the present invention, the advantageous effect is exhibited of enabling prevention of a large difference from arising in exposure timing in cases in which plural pixels have a common amplifier, even when image data is read by thinning.

BRIEF DESCRIPTION OF DRAWINGS

FIG. 3 is a diagram illustrating a basic array pattern contained in a color filter according to the first exemplary embodiment.

FIG. 4 is a diagram illustrating a color filter in which 6×6 pixel basic array patterns contained in a color filter according to the first exemplary embodiment are split into 3×3 pixel A arrays and B arrays that are repeatedly disposed along a horizontal direction and a vertical direction.

FIG. 9 is a diagram to explain a case in which reading with ½ thinning is performed in the vertical direction and the horizontal direction.

FIG. 11 is an explanatory diagram regarding an image after thinning

FIG. 13 is an explanatory diagram regarding timing, such as of light exposure of each scan line, according to a first exemplary embodiment.

FIG. 25 is a diagram of a modified example of a color filter.
FIG. 27 is a diagram of a modified example of a color filter.
FIG. 28 is a diagram of a modified example of a color filter.
FIG. 29 is a diagram of a modified example of a color filter.

DESCRIPTION OF EMBODIMENTS

Explanation follows regarding exemplary embodiments of the present invention, with reference to the drawings.

First Exemplary Embodiment

Figure 1:
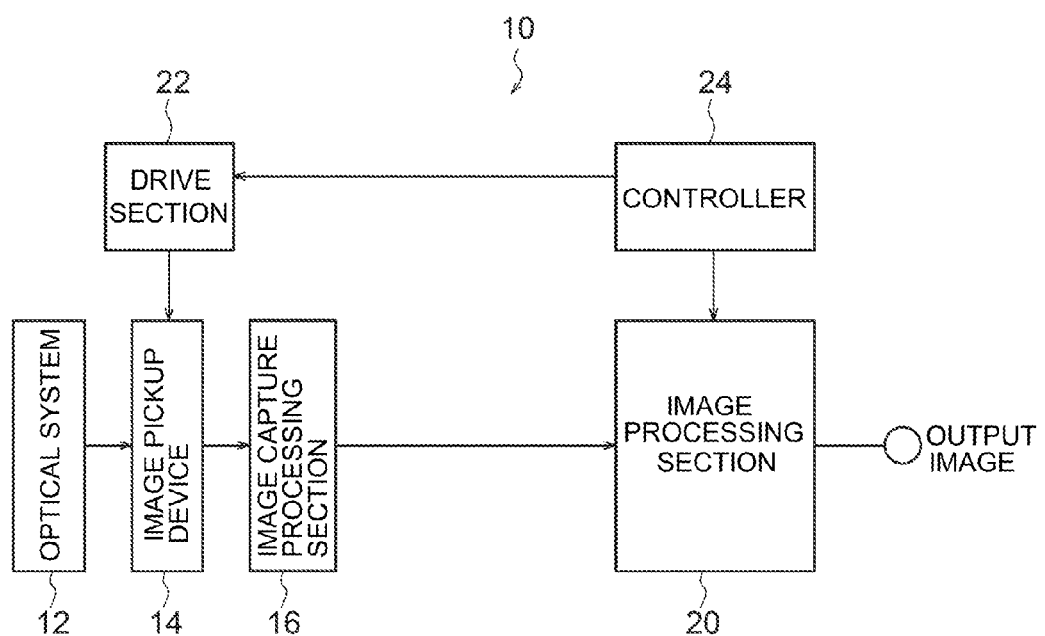
FIG. 1 is a schematic block diagram of an imaging apparatus according to a first exemplary embodiment.

FIG. 1 is a schematic block diagram illustrating an imaging apparatus 10 according to the present exemplary embodiment. The imaging apparatus 10 is configured including an optical system 12, an image pickup device 14, an image capture processing section 16, an image processing section 20, a drive section 22, and a controller 24.

The optical system 12 is configured including, for example, a lens set configured from plural optical lenses, an aperture adjustment mechanism, a zoom mechanism, and an automatic focusing mechanism.

The image pickup device 14 is what is referred to as a 1-chip image pickup device configured by an image pickup device, for example a MOS type image sensor such as a Complementary Metal Oxide Semiconductor (CMOS), containing plural photoelectric conversion elements arrayed in the horizontal direction and vertical direction, with a color filter disposed above the image pickup device.

Figure 2:
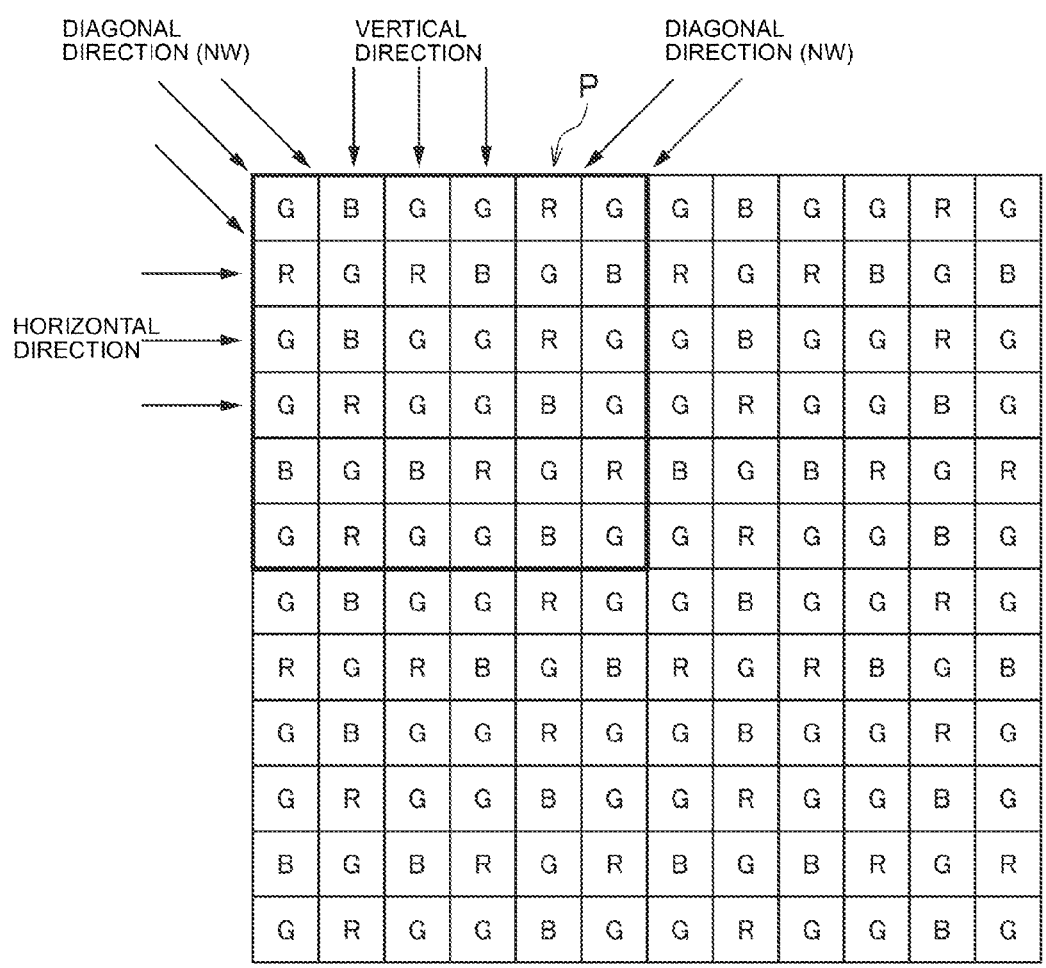
FIG. 2 is a configuration diagram of a color filter according to the first exemplary embodiment.

FIG. 2 illustrates a portion of a color filter according to the present exemplary embodiment. One out of 3 primary color filters, red (R), green (G) and blue (B), is placed over each of the pixels.

Color Filter Array Features

The color filter of the first exemplary embodiment includes the following features (1) to (6).

Feature (1)

The color filter array has a repeatedly disposed basic array pattern of a predetermined pattern of (N×M) pixels (wherein N, M are integers of 3 or more) in the vertical direction and the horizontal direction of the 3 primary color filters red (R), green (G) and blue (B), wherein the green (G) filter, and at least one color filter out of the red (R) or the blue (B), are each placed in the vertical direction and the horizontal direction.

The color filter according to the present exemplary embodiment illustrated in FIG. 2 includes a basic array pattern P (the pattern indicated by the bold frame) formed from square array patterns corresponding to, as an example, 6×6 pixels (N=M=6), with the basic array pattern P disposed so as to repeat in both the vertical direction (a first direction) and the horizontal direction (a second direction). Namely, the color filter is arrayed such that the respective filters of each color R, G, B (the R filters, G filters, B filters) have a specific periodicity.

Thus arraying the R filters, G filters and B filters with a specific periodicity enables processing to be performed in a repeating pattern during, for example, synchronization processing (also referred to as demosaic processing, the same applies below) of R, G, B signals read from the color image pickup device.

Feature (2)

The color filter array illustrated in FIG. 2 has the G filter, that corresponds to the color contributing the most to obtaining a brightness signal (the color G in the present exemplary embodiment) placed in each line in the color filter array in the vertical direction that is the first direction, the horizontal direction that is the second direction, and third directions in the color filter plane that intersect with the first direction and the second direction, namely diagonal directions (NE, NW) (third directions). Note that NE means a diagonal direction toward the top right, and NW means a diagonal direction toward the bottom right. For example, for a square pixel array, the diagonal top right direction and the diagonal bottom right direction are each directions at 45° with respect to the horizontal direction. However, in a rectangular pixel array, these are the directions of the pair of diagonals of a rectangle, and their angle varies according to the lengths of the long sides and the short sides.

Placing the G filters corresponding to the brightness system pixels in each of the lines in the vertical direction, horizontal direction, and diagonal directions (NE, NW) of the color filter array, enables the reproduction precision of synchronization processing to be raised in high frequency regions, irrespective of the directionality of the high frequency.

Feature (3)

In the color filter array illustrated in FIG. 2, 1 or more of each of the R filter and the B filter, corresponding to the 2 or more colors other than the above color G (colors R, B in the present exemplary embodiment), is disposed in each line in the basic array pattern P in the vertical direction and horizontal direction of the color filter array.

Disposing the R filter and the B filter in each line in the vertical direction and horizontal direction of the color filter array enables generation of color moiré (false color) to be reduced.

This thereby enables an optical low pass filter for suppressing false color generation to be omitted from placement on the optical path of the optical system, from the incident face to the imaging plane, or, even in cases in which an optical low pass filter is applied, one can be employed that has a weak action to cut the high frequency components to prevent false color generation, thereby enabling deterioration of resolution to be avoided.

Feature (4)

FIG. 3 illustrates a state in which the basic array pattern P illustrated in FIG. 2 has been divided into 4 sets of 3×3 pixels.

The basic array pattern P, as illustrated in FIG. 3, may be perceived as an A array of the 3×3 pixels surrounded by the solid line frame, and a B array of the 3×3 pixels surrounded by the broken line frame, arrayed so as to be alternately disposed along the horizontal and vertical directions.

In both the A array and the B array, the G filters that are the brightness system pixels are placed at the 4 corners and at the center, thereby being placed over both diagonal lines. In the A array, R filters are placed on both sides of the central G filter in the horizontal direction, and B filters are placed on both sides of the central G filter in the vertical direction. However in the B array, B filters are placed on both sides of the central G filter in the horizontal direction, and R filters are placed on both sides of the central G filter in the vertical direction.

Namely, the A array and the B array have reverse positional relationships for the R filters and the B filters, but have similar placement otherwise.

Due to disposing the A array and the B array alternately in the vertical direction and the horizontal direction, as illustrated in FIG. 4, the 4 corner G filters in the A array and the B array form square array G filters corresponding to 2×2 pixels.

Namely, the color filter array (basic array pattern P) illustrated in FIG. 2 includes square arrays corresponding to 2×2 pixels configured by G filters.

Figure 5:
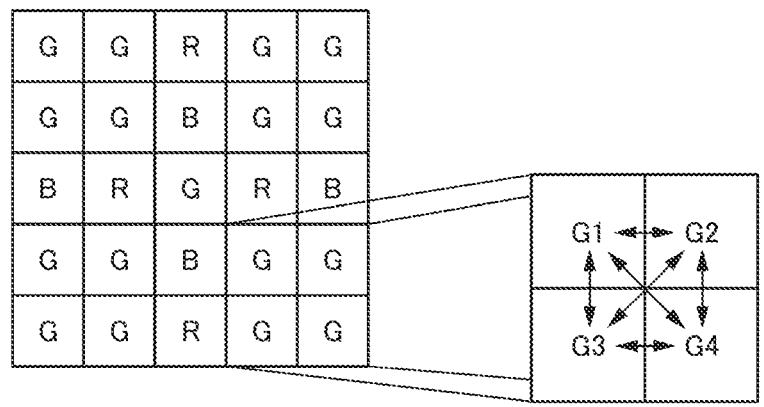
FIG. 5 is a diagram illustrating a distinctive placement of G pixels in a color filter according to a first exemplary embodiment.

When, as illustrated in FIG. 5, a 5×5 pixel local region centered on an A array is extracted from a mosaic image output from the image pickup device 14, the 2×2 pixels of G pixels at the 4 corners in the local region are disposed as illustrated in FIG. 5.

As illustrated in FIG. 5, taking the pixel values of the 2×2 pixels of G pixels as G1, G2, G3, G4 in sequence from top left to bottom right, the vertical direction difference absolute value of the pixel values of these G pixels is (|G1−G3|+|G2−G4|)/2, the difference absolute value in the horizontal direction is (|G1−G2|+|G3−G4|)/2, the difference absolute value in the diagonal direction towards the top right is |G2−G3|, and the difference absolute value in the diagonal direction towards the top left is |G1−G4|.

The correlation (correlation direction) can then be determined as the direction with the smallest difference absolute value out of these four correlation absolute values.

As illustrated in FIG. 4 or FIG. 5, when a 5×5 pixel local region is extracted from a mosaic image such that the 3×3 pixel A array is positioned at its center, there are 2×2 pixels of G pixels placed at the 4 corners thereof. Consequently, when the 3×3 pixels of the A array inside the above local region are pixels subject to synchronization processing, the sums (or the average values) of the correlation absolute values of the 4 corners are derived separately for each direction, and the direction having the smallest value out of the sums (or the average values) of the correlation absolute values for each direction is determined as the brightness correlation direction of the pixels subject to synchronization processing. The determined correlation direction may be employed when performing synchronization processing or the like.

Feature (5)

Moreover, the basic array pattern P configuring the color filter array illustrated in FIG. 2 has point symmetry about the center of the basic array pattern (the center of the 4 G filters). Moreover, as illustrated in FIG. 3, each of the A array and the B array inside the basic array pattern also respectively have point symmetry about the central G filters, and also have top-bottom and left-right symmetry (line symmetry).

This symmetry enables the circuit scale of a processing circuit at a later stage to be made smaller, and to be simplified.

Feature (6)

Moreover, the size of the basic array pattern P that configures the color filter array illustrated in FIG. 2 is (N×M) pixels (wherein N, M are integers of 3 or more). Moreover, although discussed in detail later, briefly the size of common pixels that are plural pixels that are common to a single amplifier is (K×L) pixels (wherein K, L are integers of 2 or more). The size of the basic array pattern P is greater than the size of the common pixels. Namely, N>K, and M>L is satisfied.

Figure 6:
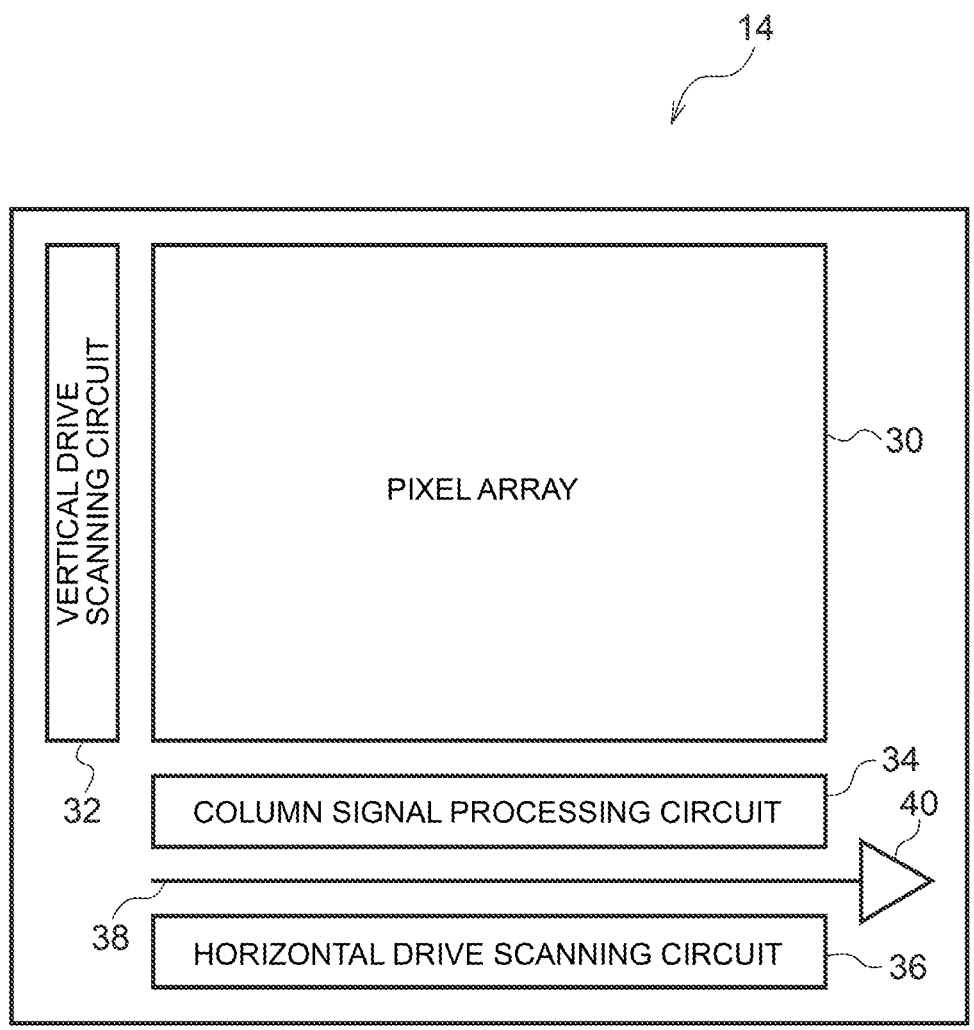
FIG. 6 is a schematic configuration diagram of an image pickup device configured by a CMOS sensor according to a fourth exemplary embodiment.

The image pickup device 14 is, as described above, configured by a CMOS image sensor. FIG. 6 illustrates a schematic configuration of the image pickup device 14 configured by the CMOS image sensor. As illustrated in FIG. 6, the image pickup device 14 is configured including a pixel array 30, a vertical drive scanning circuit 32, a column signal processing circuit 34, a horizontal drive scanning circuit 36, a signal line 38, and an amplifier 40, formed on a semiconductor substrate.

The pixel array 30 includes plural pixels arrayed in a two dimensional pattern in the horizontal direction and the vertical direction.

The vertical drive scanning circuit 32 selects and drives a collection of plural pixels on a scan line that runs along the horizontal direction. Note that it is also possible to select and drive pixels on a scan line one-by-one.

The column signal processing circuit 34 is configured by plural signal processing circuits, not illustrated in the drawings. These signal processing circuits are provided one for each of the common pixels in the horizontal direction. Each of the signal processing circuits is configured including an analogue-to-digital converter (ADC) circuit, not illustrated in the drawings. These ADC circuits convert image capture signals into respective digital signals according to the pixel values of each of the pixels.

The horizontal drive scanning circuit 36 is configured by switches, not illustrated in the drawings, that are respectively connected to each of the plural signal processing circuits contained in the column signal processing circuit 34, and by a control circuit that performs ON/OFF control of the switches. By switching the switches ON, the image capture signals processed in the signal processing circuits are output to the signal line 38, and the image capture signals are output to the outside of the image pickup device 14 through the amplifier 40.

Note that the vertical drive scanning circuit 32, the column signal processing circuit 34, and the horizontal drive scanning circuit 36 are controlled by the drive section 22.

In the pixel array 30, (K×L) pixels (wherein K, L are integers of 2 or more) in the vertical direction and the horizontal direction configure common pixels, and the pixel array 30 is provided with an amplifier for each of the common pixels to amplify the image capture signals of each common pixel.

Figure 7:
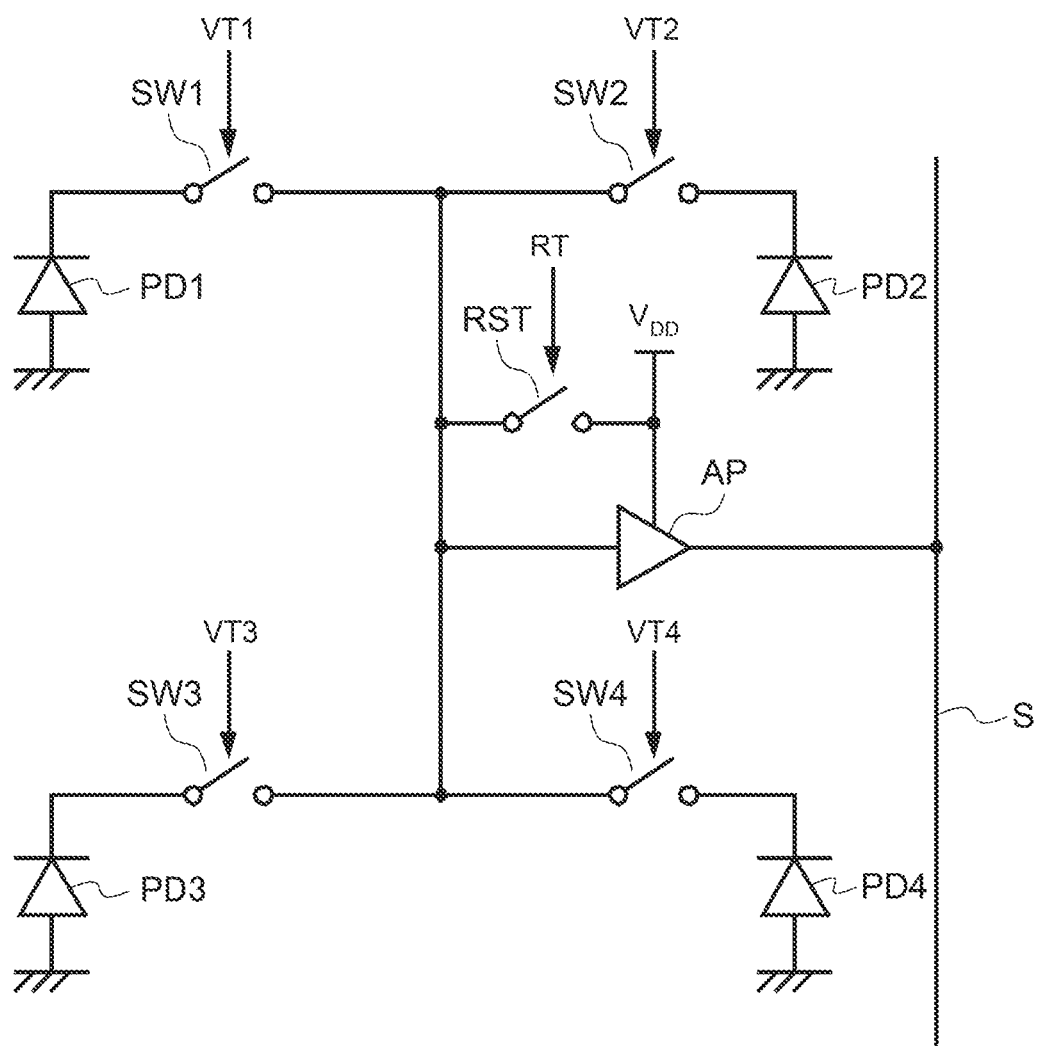
FIG. 7 is a configuration diagram illustrating a configuration of a common pixel.

FIG. 7 illustrates a configuration in which 2×2 pixels in the vertical direction and the horizontal direction, a total of 4 pixels, are configured as common pixels, and these 4 pixels are amplified by the same amplifier.

As illustrated in FIG. 7, cathodes of the photodiodes PD1 to PD4 that serve as pixels are each connected to one end of respective switches SW1 to SW4, each configured by, for example, a MOS transistor. The other ends of the switches SW1 to SW4 are connected to input terminals of a reset switch RST and an amplifier AP. The output terminal of the amplifier AP is connected to a signal line S. The signal line S is connected to the signal processing circuit of the column signal processing circuit 34, not illustrated in the drawings.

The switches SW1 to SW4 are respectively input with charge transfer control signals VT1 to VT4 from the vertical drive scanning circuit 32. The vertical drive scanning circuit 32 switches ON the switches from which it is desired to read charges, such that charges accumulated on the photodiodes connected to the switches are amplified by the amplifier AP and output to the signal line S.

In the present exemplary embodiment, configuration is made with one amplifier AP connected to each 2×2 pixels, as illustrated in FIG. 7, thereby enabling a reduction in the number of switches, and enabling a higher degree of miniaturization. Note that there is no limitation of the number of pixels configuring common pixels to 2×2, and configuration may be made with 3×3 pixels or more, or configuration may be made with different numbers of common pixels in the vertical direction and common pixels in the horizontal direction.

In a MOS type image sensor with the switches provided to each of the photodiodes such as in FIG. 7, charge sweeping is performed by what is referred to as a rolling shutter method, in which charges accumulated in the photodiodes are swept by sequentially applying a shutter pulse to each of every scan line, every plural pixels on each scan line, or every single pixel.

More specifically, reset is not performed all at once for all the pixels within a single screen, and reset, exposure start, and image capture signal reading is executed sequentially for each of every scan line, every plural pixels on a scan line, or every single pixel.

Figure 8:
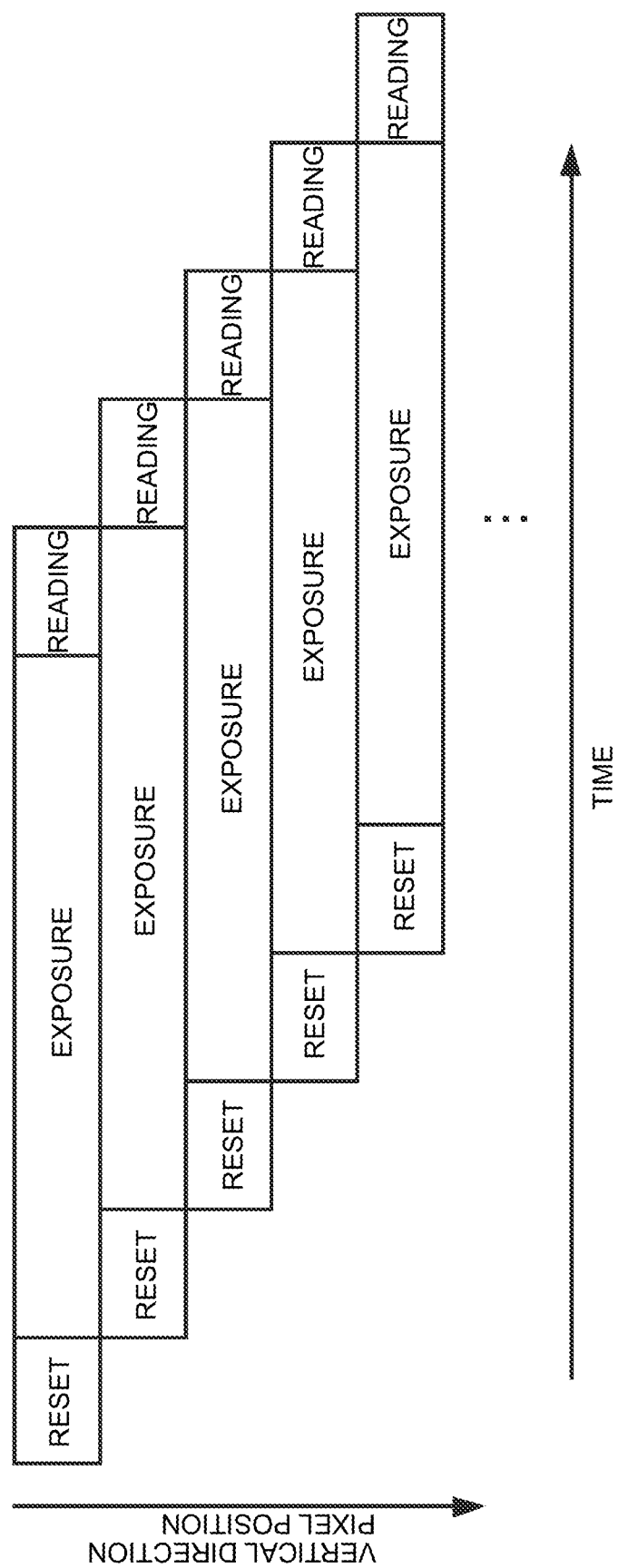
FIG. 8 is an explanatory diagram regarding timing, such as of light exposure of each scan line.

As illustrated in FIG. 8, in the case of the rolling shutter method, reset, exposure and reading is repeated, for example for every scan line.

Accordingly, when for example image data is read by thinning in the vertical direction, when trying to read plural line image data within a common pixel in the vertical direction, after completing reset, exposure and reading of pixels on a first reading line within the common pixel, then reset, exposure and reading needs to be performed of the pixels on a next reading line within the common pixel. This causes a large difference in exposure timing, creating undesirable effects such as false color in the image.

For example, consider a case, such as illustrated in FIG. 9, in which there are common pixels each of 3×3 pixels (illustrated by the bold lines in FIG. 9), and line image data is read at vertical direction ½ thinning, and horizontal direction ½ thinning. As illustrated in FIG. 9, taking positions in the vertical direction as rows, and positions in the horizontal direction as columns, each of the pixels within each common pixel is numbered respectively as a pixel 1 to 9, and pixel data is read for each pixel in every second row for vertical direction ½ thinning. Moreover, pixel data is read for each pixel in every second column for horizontal direction ½ thinning Pixel values are accordingly read for the pixels that are shaded in FIG. 9.

Note that, for example, the pixel 1 in the first row and the first column, the pixel 3 in the first row and third column, the pixel 7 in the third row and the first column, and the pixel 9 in the third row and the third column are pixels within a common pixel of 3×3 pixels. Since a single amplifier is common to each common pixel, it is not possible to read the pixel data of these 4 individual pixels all at once.

Figure 10:
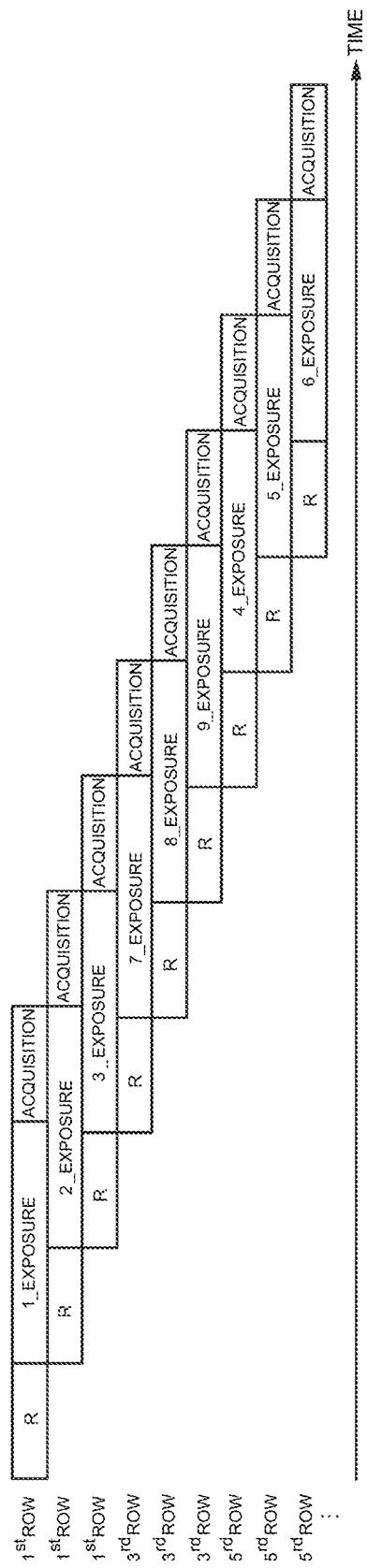
FIG. 10 is an explanatory diagram regarding conventional timing, such as of light exposure of each scan line.

Accordingly, as illustrated in FIG. 10, in a first scan, scanning, that is to say reset (R), exposure (1_exposure) and reading (acquisition), is performed for the pixels 1 that, out of the respective pixels 1 in the first row, are positioned to be read in horizontal direction ½ thinning, so as to scan the pixel 1 in the first row and the first column, the pixel 1 in the first row and the seventh column, the pixel 1 in the first row and the thirteenth column, and so on.

Then, as illustrated in FIG. 10, after completing reset for the first scan, the next scan is started. Namely, reset (R), exposure (2_exposure) and reading (acquisition) are performed for the pixels 2 that, out of the respective pixels 2 in the first row, are positioned to be read in horizontal direction ½ thinning, so as to scan the pixel 2 in the first row and the fifth column, the pixel 2 in the first row and the eleventh column, the pixel 2 in the first row and the seventeenth column, and so on.

After completing reset for the second scan, the next scan is started. Namely, reset (R), exposure (3_exposure) and reading (acquisition) are performed for the pixels 3 that, out of the respective pixels 3 in the first row, are positioned to be read in horizontal direction ½ thinning, so as to scan the pixel 3 in the first row and the third column, the pixel 3 in the first row and the ninth column, the pixel 3 in the first row and the fifteenth column, and so on.

From there onwards, as illustrated in FIG. 10, scanning is performed 3 times each for the third row and the fifth row, similarly to for the first row. Accordingly, for common pixels of 3×3 pixels, when reading of pixels data of for each pixel is performed by ½ thinning in the vertical direction and the horizontal direction, scanning needs to be performed 3 times for each row, since the plural pixels in both the vertical direction and the horizontal direction within each of the common pixels need to be read. Since there are different exposure timings even for pixels within the same row, when, for example, attempting to capture a video image of a fast moving subject the precision of interpolation processing, such as synchronization processing, deteriorates due to variation in signal amount within pixel units, sometimes giving rise to false color.

Figure 11:
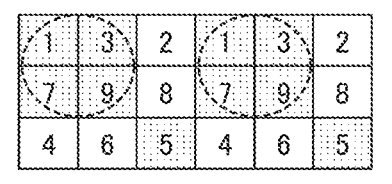

In particular, in the case of the color filter illustrated in FIG. 2, when pixel data is read for each of the pixels at horizontal direction ½ thinning and vertical direction ½ thinning, the placement of pixels after thinning is the placement illustrated in FIG. 11. In this case the pixels 1, 3, 5, 7, 9 at the 4 corners within the same common pixel are each G pixels, and each has a different respective exposure timing. Therefore, since in particular the pixels 1, 3, 7, 9 indicated in the broken line regions are placed as 2×2 pixels adjacent to one another, this exacerbates the undesirable effects caused by steps in signal amounts due to different exposure timings.

More detailed explanation is given later, however in brief, in the present exemplary embodiment, the image pickup device 14 is driven so as to read line image data of lines running along the horizontal direction at a cycle of K pixels or greater in the vertical direction. When this is performed, out of the respective pixels on the lines running in the horizontal direction, only pixels at a cycle of L pixels or greater in the horizontal direction are read. In the present exemplary embodiment, since each of the common pixels is 2×2 pixels (K=L=2), line image data running along the horizontal direction is read at a cycle of 2 line cycles or greater in the vertical direction. Accordingly, there is not plural line image data running along the horizontal direction read from within each of the common pixels in the vertical direction, enabling large differences in exposure timing to be prevented from occurring. Moreover, in the horizontal direction, only pixels at a cycle of L pixels or greater in the horizontal direction are read, and pixel data is not read from plural pixels within each of the common pixels in the horizontal direction, enabling large differences in exposure timing to be prevented.

Namely, in the present exemplary embodiment, since only one pixel is read from within each of the common pixels, in both the horizontal direction and the vertical direction respectively, large differences in exposure timing can be prevented from occurring.

Moreover, in the present exemplary embodiment, within Features (2) and (3) of the color filter array, since there is at least 1 or more of each of the G filter, the R filter, and the B filter placed in each line in the basic array pattern P in both the vertical direction and horizontal direction of the color filter array, color reproduction is enabled since pixel signals for each of R, G, B are obtained even when line image data of lines running along the horizontal direction or the vertical direction are read at a cycle of the size N×M of the basic array pattern or smaller.

The image capture processing section 16 performs predetermined processing such as amplification processing, correlation double sampling processing, or A/D conversion processing on image capture signals output from the image pickup device 14, and then outputs as image data to the image processing section 20.

The image processing section 20 subjects the image data output from the image capture processing section 16 to what is referred to as synchronization processing. Namely, for all the pixels, interpolation is performed of image data for colors other than the corresponding respective color from pixel data of peripheral pixels, so as to generate R, G, B image data for all pixels. Then, what is referred to as YC conversion processing is performed to the generated R, G, B image data, to generate brightness data Y and color difference data Cr, Cb. Resizing processing is then performed to re-size these signals to a size according to the image capture mode.

The drive section 22 performs for example driving to read image capture signals from the image pickup device 14 according to instruction from the controller 24.

The controller 24 performs overall control of the drive section 22, the image processing section 20 and so on according to such factors as the image capture mode. Although discussed in detail later, put briefly, the controller 24 instructs the drive section 22 to read image capture signals with a reading method corresponding to the image capture mode, and instructs the image processing section 20 to perform image processing corresponding to the image capture mode.

Since, depending on the image capture mode, there is a need to thin and read image capture signals from the image pickup device 14, the controller 24 instructs the drive section 22 so as to thin with a thinning method according to the instructed image capture mode and to read the image capture signals.

Examples of image capture modes include a still image mode in which a still image is captured, and video modes including an HD video mode that thins a captured image and generates High Definition (HD) video data at a comparatively high resolution and records this on a recording medium such as a memory card, not illustrated in the drawings, and a through video mode (live view mode) in which a captured image is thinned and a through video (live view image) of comparatively low resolution is output to a display section, not illustrated in the drawings, however there is no limitation of the types of image capture modes thereto.

Figure 12:
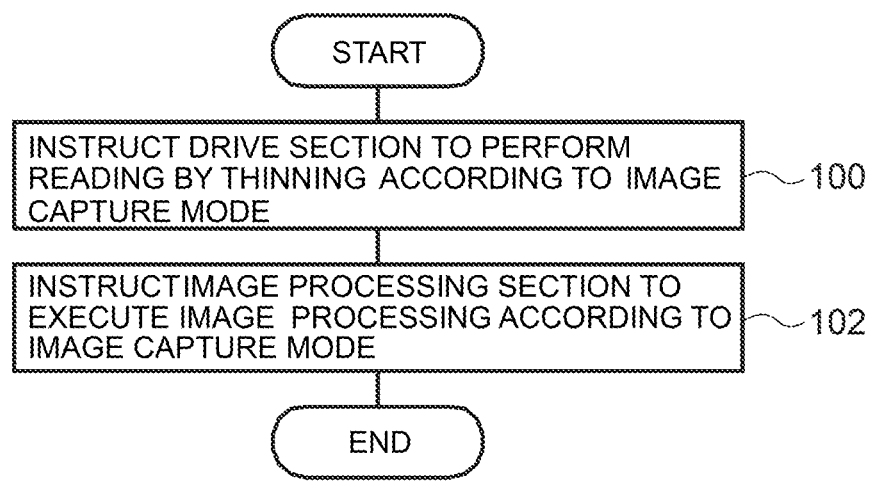
FIG. 12 is a flow charge illustrating processing executed by a controller.

Explanation follows regarding processing performed by the controller 24 as operation of the present exemplary embodiment, with reference to the flow chart illustrated in FIG. 12.

Note that the processing illustrated in FIG. 12 is executed when instruction has been given to execute imaging according to an image capture mode. The following explanation describes a case in which line image data is read at a predetermined cycle in the vertical direction, namely a case in which reading is performed in which lines other than lines of the predetermined cycle in the vertical direction are thinned (left out). The line image data in this case is a collection of pixel data of pixels in a row running along the horizontal direction.

First, at step 100, the drive section 22 is instructed to read image data using a thinning method corresponding to the image capture mode.

In the present exemplary embodiment, the image pickup device 14 is driven so as to read line image data from lines running along the horizontal direction at a cycle of 2 lines or greater in the vertical direction, and also only pixels that are at a cycle of 2 pixels or greater in the horizontal direction are read out of all of the pixels in the lines running along the horizontal direction. Namely, the controller 24 instructs the drive section 22 to read at ½ thinning in both the vertical direction and the horizontal direction (in the present exemplary embodiment, the drive section 22 and the controller 24 correspond to line image data generation means).

Figure 13:
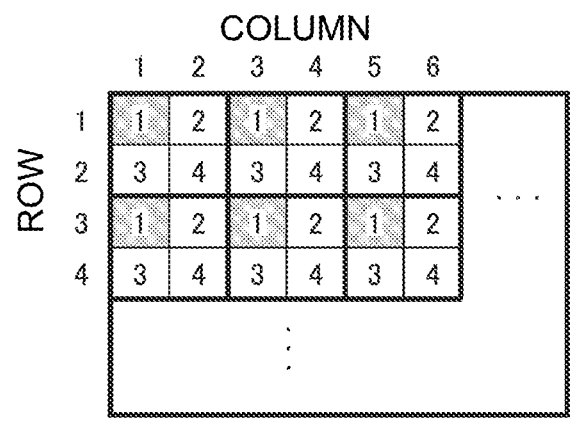

Accordingly, pixel data is read from the pixels that are shaded in FIG. 13. Namely, pixel data is read at a 2 pixel cycle in the vertical direction and the horizontal direction.

Specifically, as illustrated in FIG. 13, taking positions in the vertical direction as rows, and positions in the horizontal direction as columns, each of the pixels within each common pixel of 2×2 pixels (illustrated in the drawing within the bold frames) is numbered respectively as a pixel 1 to 4, and in the first scan, scanning is performed for all of the pixels 1 in the first row are read, so as to scan the pixel 1 in the first row and the first column, the pixel 1 in the first row and the third column, the pixel 1 in the first row and the fifth column, and so on. Namely, as illustrated in FIG. 14, reset (R), exposure (1_exposure), and reading (acquisition) are performed for all of the pixels 1 in the first row.

Figure 14:
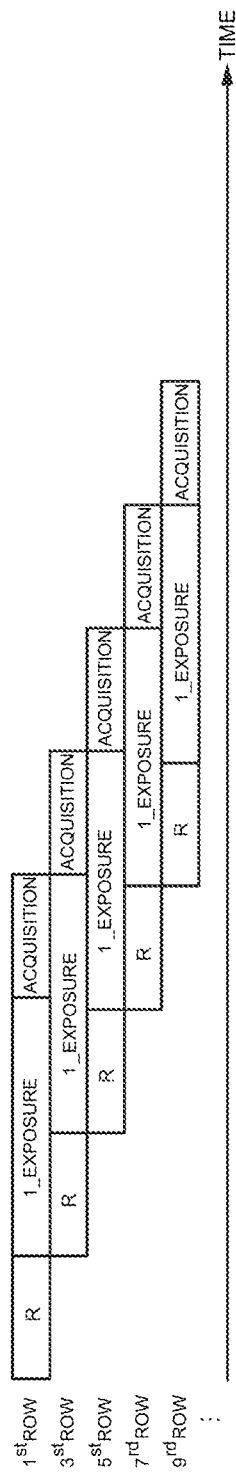
FIG. 14 is an explanatory diagram regarding timing, such as of light exposure of each scan line, according to the first exemplary embodiment.

Then, as illustrated in FIG. 14, after completing the first scan reset, the next scan is started. Namely, reset (R), exposure (2_exposure), and reading (acquisition) are performed for all of the pixels 1 in the third row, so as to scan the pixel 1 in the third row and the first column, the pixel 1 in the third row and the third column, the pixel 1 in the third row and the fifth column, and so on.

After completing the second scan reset, the next scan is started. Namely, reset (R), exposure (3_exposure), and reading (acquisition) are performed for all of the pixels 1 in the fifth row, so as to scan the pixel 1 in the fifth row and the first column, the pixel 1 in the fifth row and the third column, the pixel 1 in the fifth row and the fifth column, and so on.

From there onwards, as illustrated in FIG. 14, scanning is performed 1 time each for the fifth row, the seventh row, the ninth row and so on, similarly to for the first row. Accordingly, for each common pixel of 2×2 pixels, 1 time of scanning per row is sufficient due to reading at a cycle of both the vertical direction number and the horizontal direction number of pixels in each of the common pixels or greater, even when reading pixel data of each of the pixels using ½ thinning in both the vertical direction and the horizontal direction.

Since all the pixels within the same row have the same exposure timing as each other, deterioration of interpolation processing, such as synchronization processing, and occurrence of false color can be prevented since there is no variation in signal amount by pixel unit, even when attempting, for example, to capture a video image of a fast moving subject.

Figure 15:
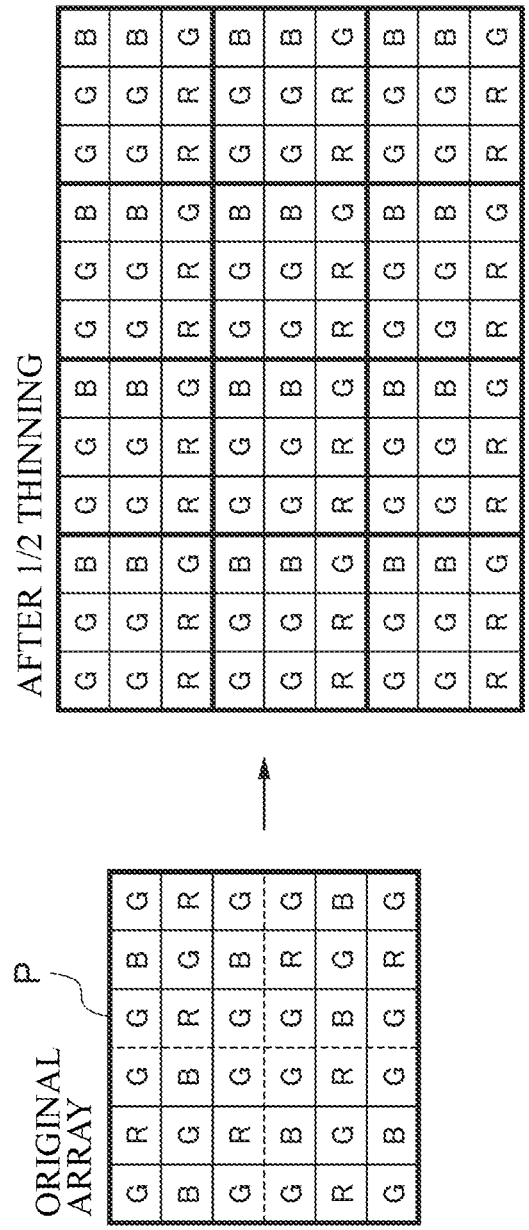
FIG. 15 is an explanatory diagram regarding an image after thinning according to the first exemplary embodiment.

Note that reading at ½ thinning in both the vertical direction and the horizontal direction produces an image such as that illustrated in FIG. 15.

At step 102, the image processing section 20 is instructed to execute image processing (such as synchronization processing, YC conversion processing, resizing processing) on the thinned and read image data according to the image capture mode (in the present exemplary embodiment, the image processing section 20 and the controller 24 correspond to image data generation means).

Note that the controller 24 and the image processing section 20 may be configured with a computer that includes for example a CPU, ROM, RAM and non-volatile ROM. In such cases a processing program for the above processing may, for example, be pre-stored on the non-volatile ROM, and then executed by reading into the CPU.

Accordingly, since in the present exemplary embodiment only one pixel within each of the respective common pixels is read in the vertical direction and the horizontal direction, 1 time of scanning per row is sufficient, and differences in exposure timing can be prevented from occurring between pixels of the same row. This thereby enables prevention of deterioration of the precision of correction processing, such as synchronization processing, due to variation in signal amount by pixel unit, and prevention of false color, even when for example attempting to capture a video image of a fast moving subject.

Note that in the present exemplary embodiment, explanation has been given regarding a case in which the image pickup device 14 is driven so as to read line image data of lines running along the horizontal direction at a cycle of K pixels or greater in the vertical direction, and the image pickup device 14 is also driven such that, out of the respective pixels in the lines running in the horizontal direction, only pixels that are at a cycle of L pixels or greater in the horizontal direction are read. However, configuration may be made such that the image pickup device 14 is driven so as to read line image data of lines running along the horizontal direction at a cycle of less than K pixels in the vertical direction.

Figure 16:
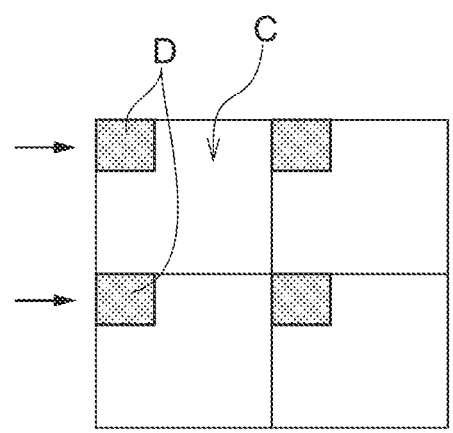
FIG. 16 is a diagram illustrating positional relationships between common pixels and read pixels.
Figure 17:
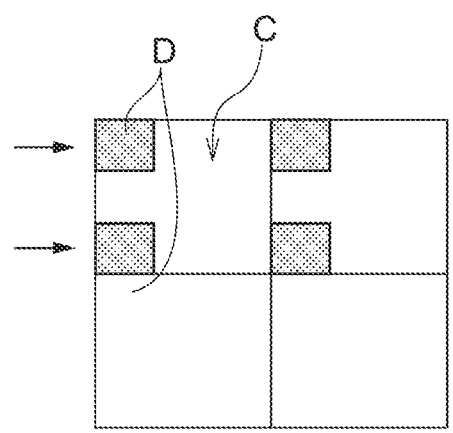
FIG. 17 is a diagram illustrating positional relationships between common pixels and read pixels.

Namely, as illustrated in FIG. 16, in the present exemplary embodiment explanation has been given regarding a case in which only a single pixel D is read within each of the common pixels C in both the vertical direction and the horizontal direction, however as illustrated in FIG. 17, in the vertical direction, plural pixels D may be read from within each of the common pixels.

Second Exemplary Embodiment

Explanation next follows regarding a second exemplary embodiment of the present invention. Explanation is given of a modified example of a color filter in the present exemplary embodiment.

Figure 18:
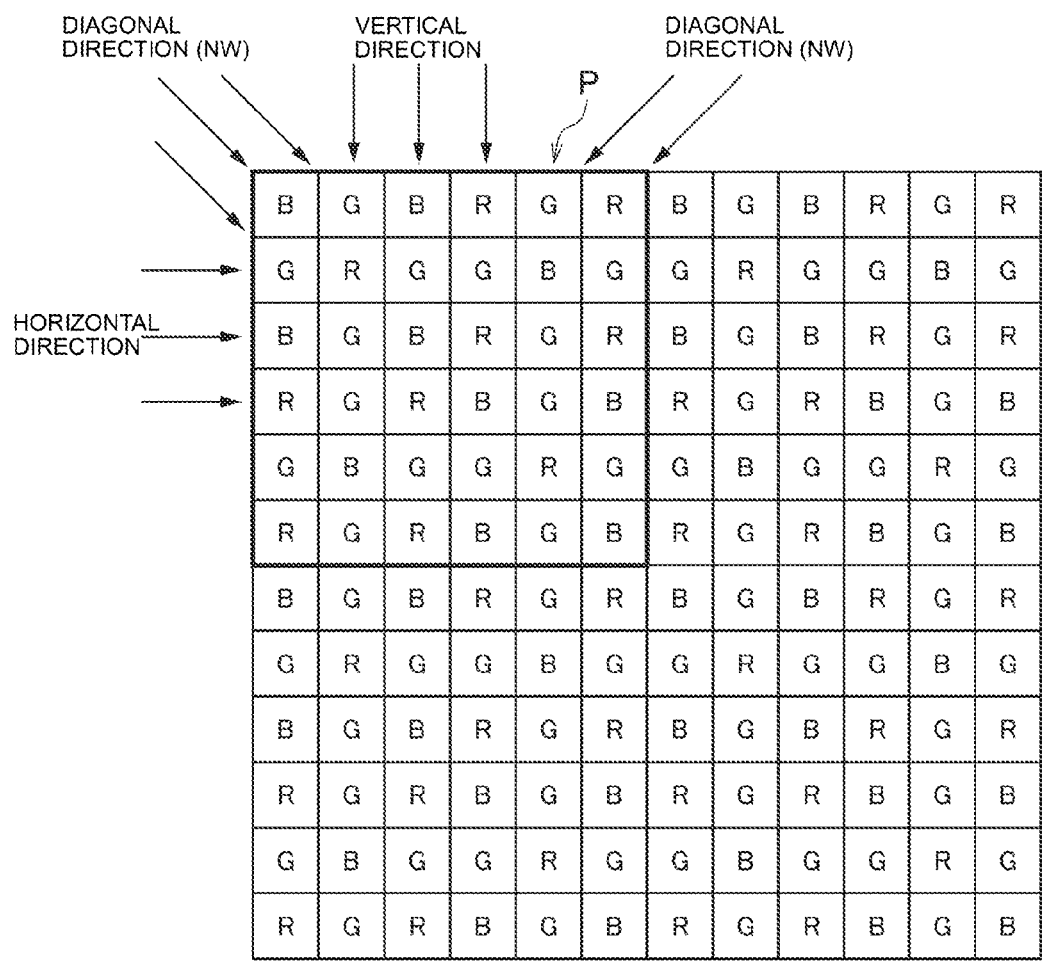
FIG. 18 is a configuration diagram of a color filter according to a second exemplary embodiment.

FIG. 18 illustrates a color filter according to the present exemplary embodiment. The color filter according to the present exemplary embodiment, as illustrated in FIG. 18, includes a basic array pattern P (the pattern indicated by the bold frame) formed from a square array pattern corresponding to 6×6 pixels, with the basic array pattern P disposed so as to repeat in both the horizontal direction and the vertical direction. Namely, the color filter is arrayed such that the respective filters of each color R, G, B (the R filters, G filters, B filters) have a specific periodicity.

Moreover, in the color filter array illustrated in FIG. 18, the G filter is placed in each line of the color filter array in both the vertical direction and horizontal direction.

Moreover, in the color filter array illustrated in FIG. 18, one or more respectively of the R filter and the B filter is placed in the basic array pattern P in each of the lines of the color filter array in both the vertical direction and horizontal direction.

Figure 19:
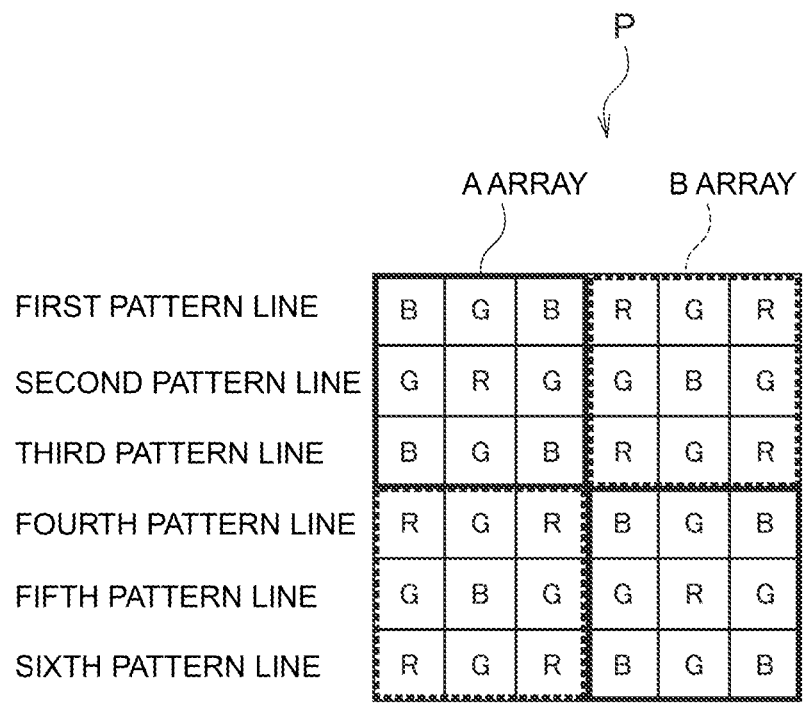
FIG. 19 is a diagram illustrating a basic array pattern contained in a color filter according to the second exemplary embodiment.

FIG. 19 illustrates a state in which the basic array pattern P illustrated in FIG. 18 has been divided into 4 sets of 3×3 pixels.

The basic array pattern P illustrated in FIG. 19 may be perceived an A array of the 3×3 pixels surrounded by the solid line frame, and a B array of the 3×3 pixels surrounded by the broken line frame, arrayed so as to be alternately disposed along the horizontal and vertical directions.

In the A array, the R filter is placed at the center, and the B filters are placed at the 4 corners, and G filters are placed on both sides of the central R filter at the top and bottom, and left and right. However in the B array, the B filter is placed at the center, and the R filters are placed at the 4 corners, and G filters are placed on both sides of the central B filter at the top and bottom, and left and right. Namely, the A array and the B array have reverse positional relationships for the R filters and the B filters, but have similar placement otherwise.

Figures 20A, 20B:
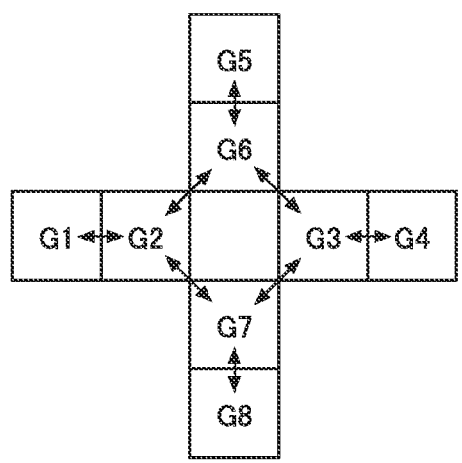
FIG. 20A is a diagram illustrating a color filter in which 6×6 pixel basic array patterns contained in a color filter according to the second exemplary embodiment are split into 3×3 pixel A arrays and B arrays that are repeatedly disposed along a horizontal direction and a vertical direction.
FIG. 20B is a diagram illustrating a distinctive placement of G pixels in a color filter according to the second exemplary embodiment.

As illustrated in FIG. 20A, the color filter of the second exemplary embodiment may be perceived as the A array and the B array, alternately disposed in the vertical direction and the horizontal direction.

As illustrated in FIG. 20A, when a 5×5 pixel local region (a region illustrated by a bold line frame) centered on an A array is extracted from a mosaic image output from the image pickup device 14, the 8 individual G pixels within this local region are placed in a cross shape, as illustrated in FIG. 20B. The G pixels therein are denoted, in sequence from left to right, G1, G2, G3, G4, and in sequence from top to bottom, G5, G6, G7, G8. Thus the pixels G1, G2, and the pixels G3, G4 are in adjacent contact with each other in the horizontal direction, the pixels G5, G6 and the pixels G7, G8 are in adjacent contact with each other in the vertical direction, the pixels G6, G3 and the pixels G2, G7 are in adjacent contact with each other in the diagonal direction toward the top left, and the pixels G6, G2 and the pixels G3, G7 are in adjacent contact with each other in the diagonal direction toward the top right.

Thus deriving the difference absolute values of the pixel values of these adjacent pixels, enables the direction from out of each of the horizontal, vertical and diagonal directions (NE, NW) that has the smallest change in brightness (the correlation direction with the highest correlation) to be determined by the minimum pixel separation.

Namely, the sum of the difference absolute values in the horizontal direction is |G1−G2|+|G3−G4|, the sum of the difference absolute values in the vertical direction is |G5−G6|+|G7−G8|, the sum of the difference absolute values in the diagonal direction towards the top right is |G6−G2|+|G3−G7|, and the sum of the difference absolute values in the diagonal direction towards the top left is |G6−G3|+|G2−G7|.

The correlation (correlation direction) can then be determined as the direction with the smallest difference absolute value out of these four correlation absolute values. Note that the determined correlation direction can be employed during the performance of processing such as synchronization processing.

The basic array pattern P that configures the color filter illustrated in FIG. 18 has point symmetry about the center of the basic array pattern P.

As illustrated in FIG. 19, the A array and the B array within the basic array pattern each have point symmetry about a central R filter, or B filter, and are top-bottom and left-right symmetrical (have line symmetry).

Moreover, the size of the basic array pattern P that configures the color filter array illustrated in FIG. 18 is (N×M) pixels (wherein N, M are integers of 3 or more), which is greater than the common pixel size of (K×L) pixels (wherein K, L are integers of 2 or more). Namely, N>K, and M>L is satisfied.

The color filter according to the second exemplary embodiment accordingly has the same features to the features (1), and (3) to (6) of the color filter according to the first exemplary embodiment. (Features (2), (3) incorporate the feature that 1 or more of each of the G filter, the R filter, and the B filter is placed in each of the lines in the vertical direction and horizontal direction of the color filter array within the basic array pattern P.

Figure 21:
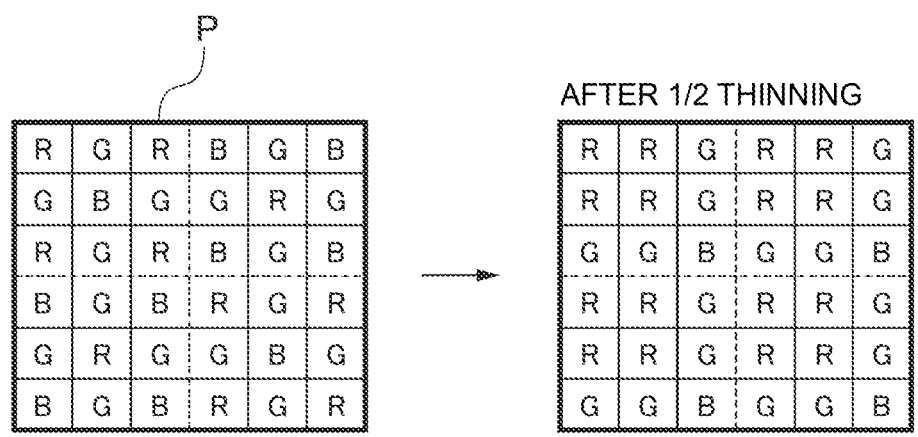
FIG. 21 is a diagram to explain an image after thinning according to the second exemplary embodiment.

Thus for such a color filter, when ½ thinning reading is performed in both the vertical direction and horizontal direction similarly to in the first exemplary embodiment, the image after thinning is the image as illustrated in FIG. 21.

Note that the color filter array is not limited to those described in each of the exemplary embodiments, and the present invention may also be applied to an imaging apparatus having an image pickup device with the following color filter array.

Figure 22:
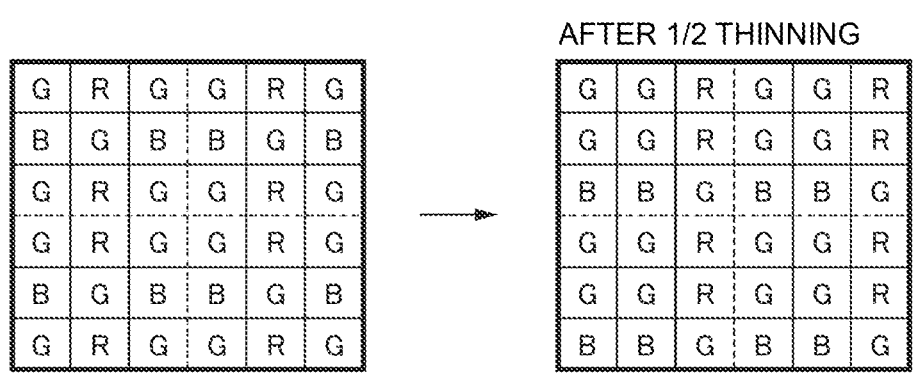
FIG. 22 is a diagram of a modified example of a color filter.

For example, as a color filter array having the above features (1), (2), (3) and (6), there is, for example, a color filter in which the basic array pattern P is a 3×3 pixel color filter as illustrated in FIG. 22. This color filter array is configured by a repeating basic pattern with the G filters placed at the center and the 4 corners out of the 3×3 pixels, and the same number each of R and B placed on the remaining 4 pixels. An image from ½ thinning in both the vertical direction and horizontal direction is an image such as the one illustrated in FIG. 22.

Figure 23:
FIG. 23 is a diagram of a modified example of a color filter.

Moreover, as a color filter array having the above features (1), (2), (3) and (6), there is a color filter array of 5×5 pixels in the basic array pattern P such as that illustrated in FIG. 23. This color filter array is configured by a repeating basic array pattern P set with G placed along the two diagonal directions in the 5×5 pixels, and with R, B pixels placed on the remaining pixel positions such that there is 1 or more of each disposed in each of the horizontal direction and vertical direction lines in the 5×5 pixels, set such the number of G is greater than the number of R and the number of B. An image from ½ thinning in the vertical direction and horizontal direction is an image such as the one illustrated in FIG. 23.

Figure 24:
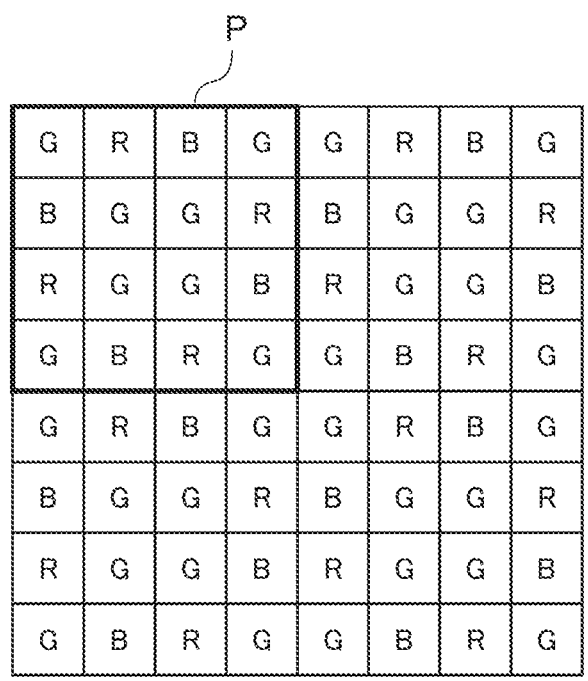
FIG. 24 is a diagram of a modified example of a color filter.

As well as this, as a color filter array having the above features (1), (3), (4), (5) and (6), there is a color filter array of 4×4 pixels of a basic array pattern P such as that illustrated in FIG. 24. This color filter array is a repeating basic array pattern in which G is placed along the two diagonal directions of the 4×4 pixels, and R, B pixels are placed on the remaining pixel positions such that there is 1 or more of each disposed in each of the horizontal direction and vertical direction lines in the 4×4 pixels, set such the number of G is greater than the number of R and the number of B.

Moreover, there is, as illustrated in FIG. 25, a color filter array in which the basic array pattern P has 5×5 pixels.

Figure 26:
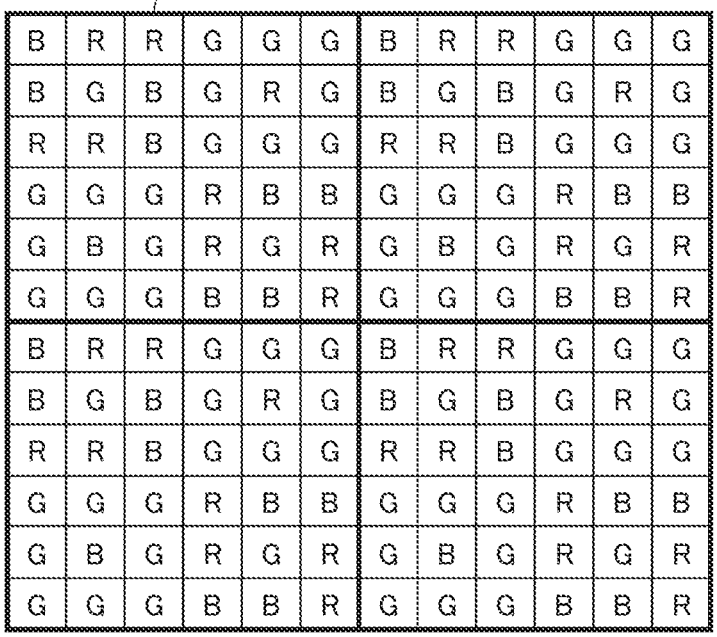
FIG. 26 is a diagram of a modified example of a color filter.

Moreover, there is, as illustrated in FIG. 26 a color filter array in which the basic array pattern P has 6×6 pixels. This color filter array is configured by a repeating basic array pattern P including a first sub array with G placed in a rectangular shape at the external perimeter of an R or B, and a second sub array in which G is placed at a center portion, with two of each of the sub arrays alternately disposed so as to be adjacent to each other along the horizontal direction and the vertical direction. Such an array is feature (3) with the additional characteristic of 1 or more of each of R and B being placed in each line in the diagonal (NE, NW) directions (third directions) of the color filter array.

Figure 27:
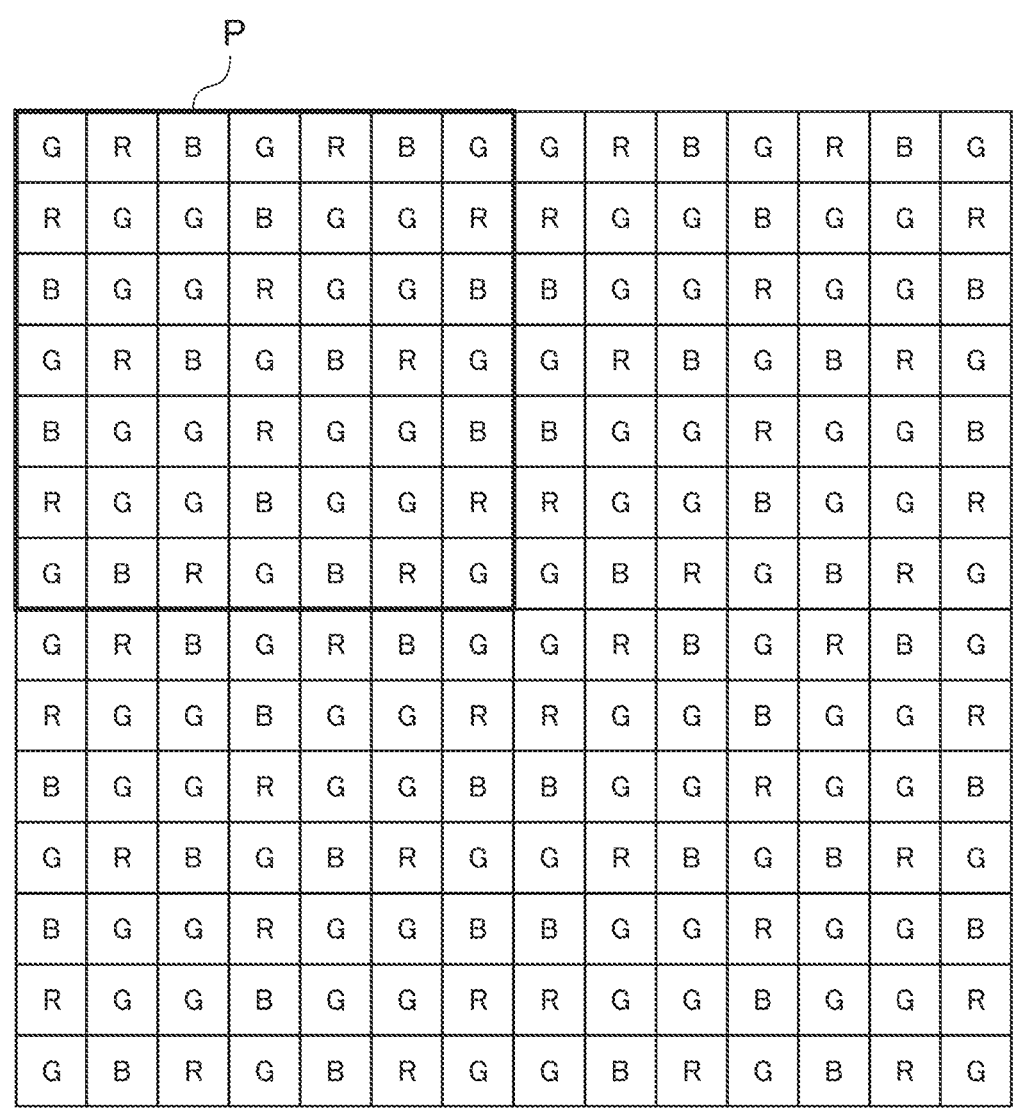
Figure 28:
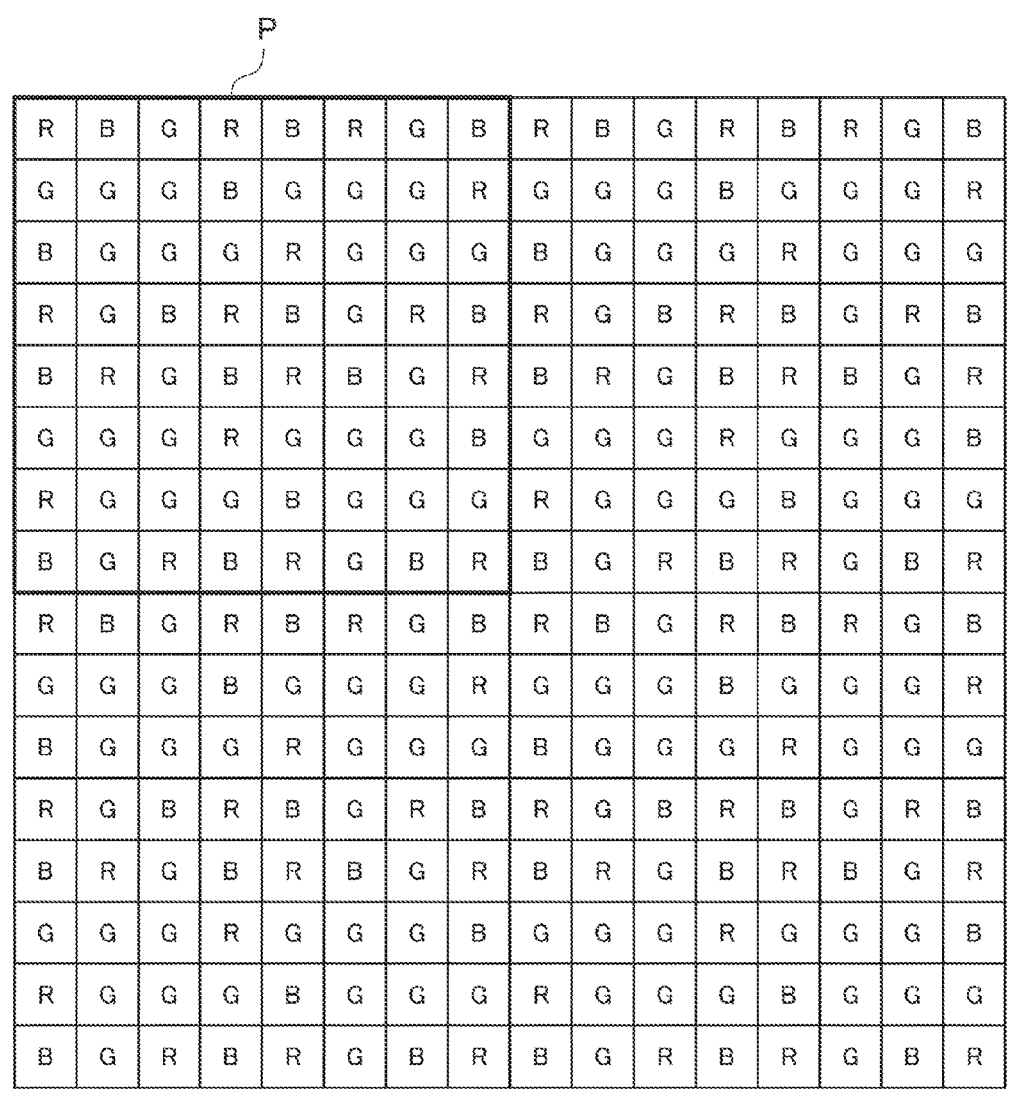

Moreover, there is, as illustrated in FIG. 27 a color filter array in which the basic array pattern P has 7×7 pixels, and, as illustrated in FIG. 28, a color filter array in which the basic array pattern P has 8×8 pixels, and so on.

Note that in consideration of the ease of image processing, such as synchronization processing or thinning processing during video image capture, preferably N, M are each 10 or lower.

Moreover, although explanation has been given in the above exemplary embodiment of a case in which there is a color image pickup device having 3 primary color filters, RGB, the present invention is not limited thereto, and application may be made to a color filter having 4 colors of the three primary colors RGB+one other color (for example, emerald (E)), such as for example the color filter illustrated in FIG. 29. Moreover, the present invention may be applied to a color filter having a white or transparent (W) filter as the other color. For example, a W filter may be placed instead of the emerald of FIG. 29. In such cases, a combination of W and G, or W is the first color that contributes most to the brightness signal.

Moreover, the present invention may be applied to a color image pickup device including a color filter with a complementary color system of 4 colors with, in addition to G, C (cyan), M (magenta) and Y (yellow), that are the complementary colors of the primary colors RGB.

Moreover, in the present exemplary embodiment, explanation has been given of cases in which reading is performed at a 2 pixel cycle in both the vertical direction and the horizontal direction, and image data generated therefrom. However, configuration may be made such that pixel signals for all pixels' worth of pixels are read, and then image data generated by selectively employing pixel data of the pixels that are at 2 pixel cycles in the vertical direction and the horizontal direction (by not using, or by not storing, pixel data of other pixels). Moreover, pixel signals in all pixels' worth of pixels may be read and temporarily stored, in memory such as RAM, and then image data generated by selectively using the pixel data of pixels that are at 2 pixel cycles in the vertical direction and the horizontal direction (in this embodiment, the image capture processing section 16 or the image processing section 20 corresponds to the line image data generation means).

It goes without saying that the present invention is not limited by the exemplary embodiments that are described above, and various other modifications may be implemented within a range not departing from the spirit of the present invention.

What is claimed is:

1. An imaging apparatus comprising:
   an image pickup device comprising a plurality of photoelectric conversion elements arrayed in a predetermined first direction and a second direction intersecting with the first direction;
   an amplification section that treats as respective common pixels (K×L) pixels in the first direction and the second direction (wherein K, L are integers of 2 or more), and amplifies an image capture signal for each of the common pixels;
   a color filter that is provided above a plurality of pixels configured by the plurality of photoelectric conversion elements, the color filter having a repeatedly disposed basic array pattern that includes a first filter corresponding to a first color that contributes most to obtaining a brightness signal, and second filters respectively corresponding to 2 or more second colors other than the first color, placed in a predetermined pattern of (N×M) pixels in the first direction and the second direction (wherein N>K and M>L);
   a line image data generation section that performs charge sweeping by applying sequential shutter pulses to the image pickup device in turn to each pixel, or to each scan line running along the second direction, or to each plurality of pixels on a scan line running along the second direction, and reading pixel signals of the plurality of pixels at a set cycle from the image pickup device, and, from the read pixel signals, generating line image data of pixels, from out of the plurality of pixels, that are arrayed running along the second direction at a cycle of from K pixels to N pixels in the first direction; and
   an image data generating section that generates image data based on the line image data.

2. The imaging apparatus of claim 1, wherein:
the line image data generation section generates pixel data of pixels that are arrayed at a cycle of from L pixels to M pixels in the second direction.

3. The imaging apparatus of claim 1, wherein:
as the set cycle for reading pixel signals of the plurality of pixels from the image pickup device, the line image data generation section generates line image data by reading the pixel signals of pixels, from out of the plurality of pixels, that are arrayed running along the second direction at a cycle of from K pixels to N pixels in the first direction.

4. The imaging apparatus of claim 2, wherein:
as the set cycle for reading pixel signals of the plurality of pixels from the image pickup device, the line image data generation section generates line image data by reading the pixel signals of pixels, from out of the plurality of pixels, that are arrayed at a cycle of from L pixels to M pixels in the second direction.

5. The imaging apparatus of claim 1, wherein:
one or more of the first filter is placed in each line in the color filter in the first direction, the second direction, and third directions that intersect with the first direction and the second direction; and
the second filters that respectively correspond to each color of the second colors are placed such that there is 1 or more of each in each line in the basic array pattern in the first direction and the second direction.

6. The imaging apparatus of claim 1, wherein:
the color filter includes a square array corresponding to 2×2 pixels configured from the first filter.

7. The imaging apparatus of claim 1, wherein:
the first color is green (G), and the second colors are red (R) and blue (B).

8. The imaging apparatus of claim 7, wherein:
the color filter includes an R filter, a G filter, and a B filter corresponding to colors red (R), green (G) and blue (B); and
the color filter is configured by a first array and a second array alternately arrayed in the first direction and the second direction, wherein the first array corresponds to 3×3 pixels with the G filter placed at the center and the 4 corners, the B filter placed at the top and bottom of the central G filter, and the R filter placed at the left and right of the central G filter, and the second array corresponds to 3×3 pixels with the G filter placed at the center and the 4 corners, the R filter placed at the top and bottom of the central G filter, and the B filter placed at the left and right of the central G filter.

9. The imaging apparatus of claim 7, wherein:
the color filter includes an R filter, a G filter, and a B filter corresponding to colors red (R), green (G) and blue (B); and
the color filter is configured by a first array and a second array alternately arrayed in the first direction and the second direction, wherein the first array corresponds to 3×3 pixels with the R filter placed at the center, the B filter placed at the 4 corners, and the G filter placed at the top, bottom, left and right of the central R filter, and the second array corresponds to 3×3 pixels with the B filter placed at the center, the R filter placed at the 4 corners, and the G filter placed at the top, bottom, left and right of the central B filter.

10. A control method for an imaging apparatus comprising an image pickup device comprising a plurality of photoelectric conversion elements arrayed in a predetermined first direction and a second direction intersecting with the first direction, an amplification section that treats as respective common pixels (K×L) pixels in the first direction and the second direction (wherein K, L are integers of 2 or more), and amplifies an image capture signal for each of the common pixels, and a color filter that is provided above a plurality of pixels configured by the plurality of photoelectric conversion elements, the color filter having a repeatedly disposed basic array pattern that includes a first filter corresponding to a first color that contributes most to obtaining a brightness signal, and second filters respectively corresponding to 2 or more second colors other than the first color, placed in a predetermined pattern of (N×M) pixels in the first direction and the second direction (wherein N>K and M>L), the control method comprising:
performing charge sweeping by applying sequential shutter pulses to the image pickup device in turn to each pixel, or to each scan line running along the second direction, or to each of groups of a plurality of pixels on a scan line running along the second direction, and reading from the image pickup device pixel signals of the plurality of pixels at a set cycle;
generating, from the read pixel signals, line image data of pixels, from out of the plurality of pixels, that are arrayed running along the second direction at a cycle of from K pixels to N pixels in the first direction; and
generating image data based on the line image data.

11. A non-transitory storage medium storing a control program that causes processing to be executed in a computer that controls an imaging apparatus equipped with an image pickup device comprising a plurality of photoelectric conversion elements arrayed in a predetermined first direction and a second direction intersecting with the first direction, an amplification section that treats as respective common pixels (K×L) pixels in the first direction and the second direction (wherein K, L are integers of 2 or more), and amplifies an image capture signal for each of the common pixels, and a color filter that is provided above a plurality of pixels configured by the plurality of photoelectric conversion elements, the color filter having a repeatedly disposed basic array pattern that includes a first filter corresponding to a first color that contributes most to obtaining a brightness signal, and second filters respectively corresponding to 2 or more second colors other than the first color, placed in a predetermined pattern of (N×M) pixels in the first direction and the second direction (wherein N>K and M>L), the processing comprising:
a reading step of performing charge sweeping by applying sequential shutter pulses to the image pickup device in turn to each pixel, or to each scan line running along the second direction, or to each of groups of a plurality of pixels on a scan line running along the second direction, and reading from the image pickup device pixel signals of the plurality of pixels at a set cycle;
a step of generating, from the read pixel signals, line image data of pixels, from out of the plurality of pixels, that are arrayed running along the second direction at a cycle of from K pixels to N pixels in the first direction; and
a step of generating image data based on the line image data.

* * * * *